(12) United States Patent
Harry et al.

(10) Patent No.: US 11,734,636 B2
(45) Date of Patent: Aug. 22, 2023

(54) SYSTEM AND METHOD FOR ASSESSING, MEASURING, MANAGING, AND/OR OPTIMIZING CYBER RISK

(71) Applicants: UNIVERSITY OF MARYLAND, COLLEGE PARK, College Park, MD (US); DECISION POINT ANALYTICS, LLC, Severna Park, MD (US)

(72) Inventors: Charles Thomas Harry, Severna Park, MD (US); Trevor Tart, Eldersburg, MD (US)

(73) Assignees: UNIVERSITY OF MARYLAND, COLLEGE PARK, College Park, MD (US); DECISION POINT ANALYTICS, Severna Park, MD (US)

( * ) Notice: Subject to any disclaimer, the term of this patent is extended or adjusted under 35 U.S.C. 154(b) by 0 days.

(21) Appl. No.: 16/803,696

(22) Filed: Feb. 27, 2020

(65) Prior Publication Data
US 2020/0272972 A1   Aug. 27, 2020

Related U.S. Application Data

(60) Provisional application No. 62/811,329, filed on Feb. 27, 2019.

(51) Int. Cl.
*G06Q 10/06* (2023.01)
*G06Q 10/0637* (2023.01)
(Continued)

(52) U.S. Cl.
CPC ... *G06Q 10/06375* (2013.01); *G06Q 10/0635* (2013.01); *H04L 41/12* (2013.01); *H04L 63/1433* (2013.01)

(58) Field of Classification Search
CPC .......... G06Q 10/0635; G06Q 10/06375; H04L 41/12; H04L 63/1433
See application file for complete search history.

(56) References Cited

U.S. PATENT DOCUMENTS 6,535,227 B1    3/2003  Fox et al.
7,890,869 B1 *  2/2011  Mayer .................. G06F 21/577
                                          709/224
(Continued)

OTHER PUBLICATIONS

"On Identifying the Critical Nodes and Vulnerable Edges for Increasing Network Security", M Alshaer, P Cotae, 2018—peer. asee.org (Year: 2018).*

(Continued)

*Primary Examiner* — Rutao Wu
*Assistant Examiner* — Stephen S Swartz
(74) *Attorney, Agent, or Firm* — Squire Patton Boggs (US) LLP

(57) ABSTRACT

Systems, methods, apparatuses, and computer program products for a computer device capable of assessing, measuring, managing, and optimizing cyber risk. For example, certain embodiments described herein may guide risk assessment for individual organizations and for integrated elements of critical infrastructure. Certain embodiments may provide features that make it possible for policy makers and organizational leaders to assess a range of risks introduced by threat actors: a standardized system for classifying cyber threats and events by their effects, tools to associate organizational functions with information technology (IT) network maps or topologies, operations to assess the severity of disruptive and exploitative cyber events, and operations to understand the integrated nature of risk across different parts of a simple organization, across major divisions in a complex organization, or to display the interconnectedness of organizations in a complex system.

14 Claims, 18 Drawing Sheets

(51) Int. Cl.
    *H04L 9/40* (2022.01)
    *G06Q 10/0635* (2023.01)
    *H04L 41/12* (2022.01)

(56) References Cited

U.S. PATENT DOCUMENTS

| | | | | |
|---|---|---|---|---|
| 8,312,549 | B2* | 11/2012 | Goldberg | G06Q 40/08 |
| | | | | 713/189 |
| 8,392,997 | B2* | 3/2013 | Chen | H04L 63/1433 |
| | | | | 709/224 |
| 8,495,745 | B1* | 7/2013 | Schrecker | H04L 63/00 |
| | | | | 726/25 |
| 8,601,587 | B1* | 12/2013 | Powell | G06F 21/552 |
| | | | | 726/25 |
| 8,769,412 | B2* | 7/2014 | Gill | G06F 21/577 |
| | | | | 709/224 |
| 10,841,332 | B2* | 11/2020 | Pfleger de Aguiar | H04L 41/12 |
| 11,233,821 | B2* | 1/2022 | Yadav | H04L 63/1491 |
| 2002/0120429 | A1* | 8/2002 | Ortoleva | E21B 41/0064 |
| | | | | 703/2 |
| 2005/0209897 | A1* | 9/2005 | Luhr | G06Q 40/00 |
| | | | | 705/7.28 |
| 2006/0112175 | A1* | 5/2006 | Sellers | H04L 41/5074 |
| | | | | 709/223 |
| 2007/0016542 | A1* | 1/2007 | Rosauer | G06N 5/022 |
| | | | | 706/21 |
| 2012/0180133 | A1* | 7/2012 | Al-Harbi | H04L 63/1433 |
| | | | | 726/25 |
| 2013/0104236 | A1* | 4/2013 | Ray | H04L 63/20 |
| | | | | 726/25 |
| 2014/0137257 | A1* | 5/2014 | Martinez | H04L 63/1433 |
| | | | | 726/25 |
| 2014/0172503 | A1* | 6/2014 | Hammerstrom | G06Q 50/06 |
| | | | | 705/7.31 |
| 2016/0294854 | A1* | 10/2016 | Parthasarathi | H04L 63/1408 |
| 2016/0330236 | A1* | 11/2016 | Reddy | H04L 63/1425 |
| 2017/0085595 | A1* | 3/2017 | Ng | G06Q 40/08 |
| 2018/0260561 | A1* | 9/2018 | Mestha | G06F 21/554 |
| 2018/0375892 | A1* | 12/2018 | Ganor | H04L 63/20 |
| 2019/0190955 | A1* | 6/2019 | Khan | H04L 63/1408 |
| 2020/0137101 | A1* | 4/2020 | Scott | G06F 21/552 |
| 2020/0272972 | A1* | 8/2020 | Harry | H04L 41/0894 |

OTHER PUBLICATIONS

"Categorizing and Assessing the Severity of Disruptive Cyber Incidents" C Harry, N Gallagher—2017—drum.lib.umd.edu (Year: 2017).*

Why COSO is flawed A Samad-Khan—Operational Risk, 2005—opriskadvisory.com (Year: 2005).*

Ecology-inspired cyber risk model for propagation of vulnerability exploitation in tactical edge J Morris-King, H Cam—MILCOM 2015-2015 IEEE Military . . . , 2015—ieeexplore.ieee.org (Year: 2015).*

A Framework for Categorizing Disruptive Cyber Activity and Assessing its Impact C Harry—2015—JSTOR. (Year: 2015).*

Various techniques used in connection with random digits J Von Neumann—Appl. Math Ser, 1951—dornsifecms.usc.edu (Year: 1951).* https://en.wikipedia.org/wiki/Monte_Carlo_method retrieved from the web Sep. 24, 2021 (Year: 2021).* https://en.wikipedia.org/wiki/Buffon%27s_needle_problem retrieved from the web Sep. 24, 2021 (Year: 2021).*

President Donald J. Trump, "National Cyber Strategy of the United States of America", The White House, Sep. 2018, 40 pages.

Brendan I. Koerner, "Inside the Cyberattack That Shocked the US Government", retrieved from https://www. wired.com/2016/10/inside-cyberattack-shocked-US-government/, Jan. 24, 2023, 12 pages.

Catalin Cimpanu, "Iranian Hacker Defaces IWF Website Following controversial Rio Olympics Decision", Softpedia News, Aug. 18, 2016, retrieved from https://news.softpedia.com/news/iranian-hackers-deface-iwf-website-following-controversial-rio-olympics-decision-507436.shtml, 5 pages.

Leee Mathews, "NotPetya Ransomware Attack Cost Shipping Giant Maersk Over $200 Million", Forbes, Aug. 16, 2017, retrieved from https://www.forbes.com/sites/leemathews/2017/08/16/notpetya-ransomware-attach-cost-shipping- giant-maersk-over-200-million/?sh=b223d4f4f9ae, 3 pages.

"Framework for Improving Critical Infrastructure Cybersecurity", National Institute of Standards and Technology, Version 1.1, Apr. 16, 2018, 55 pages.

Charles Harry, Phd, "A Proposed Hierarchical Taxonomy for Assessing the Primary Effects of Cyber Events: A Sector Analysis 2014-2016", University of Maryland, School of Public Policy, Center for International & Security Studies at Maryland, College Park, Maryland, Feb. 2018, 19 pages.

Dan Lamothe, "Hack of U.S. military social media accounts prompts embarrassment, review", The Washington Post, Jan. 13, 2015, 2 pages.

Robert M. Lee et al., "Analysis of the Cyber Attack on the Ukrainian Power Grid", Industrial Control Systems, Electricity Information Sharing and Analysis Center (E-ISAC), Washington, D.C., Mar. 18, 2016, 29 pages.

Ali Raza, "Anti-DDOS firm Staminus hacked, private data posted online", retrieved from https://www.hackread.com/ anti-ddos-firm-staminus-hacked-private-data-posted-online/, Mar. 13, 2016, 5 pages.

"Malware Infected All Eddie Bauer Stores in U.S., Canada", Krebs on Security, Aug. 18, 2016, retrieved from https:// krebsonsecurity.com/2016/08/malware-infected-all-eddie-bauer-stores-in-u-s-canada/, 4 pages.

Nicky Woolf, "DDoS attack that disrupted internet was largest of its kind in history, experts say", The Guardian, San Francisco, California, Oct. 26, 2016, retrieved from https://www.theguardian.com/technology/2016/oct/26/ddos-attack-dyn-mirai-botnet, 3 pages.

* cited by examiner

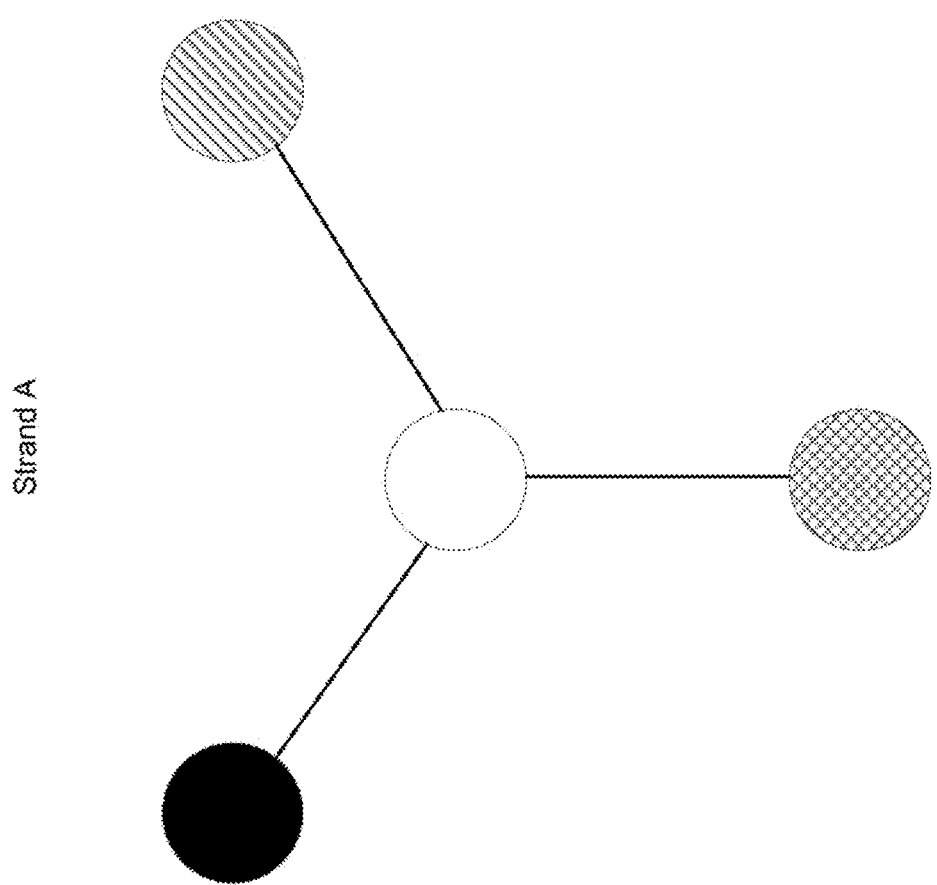

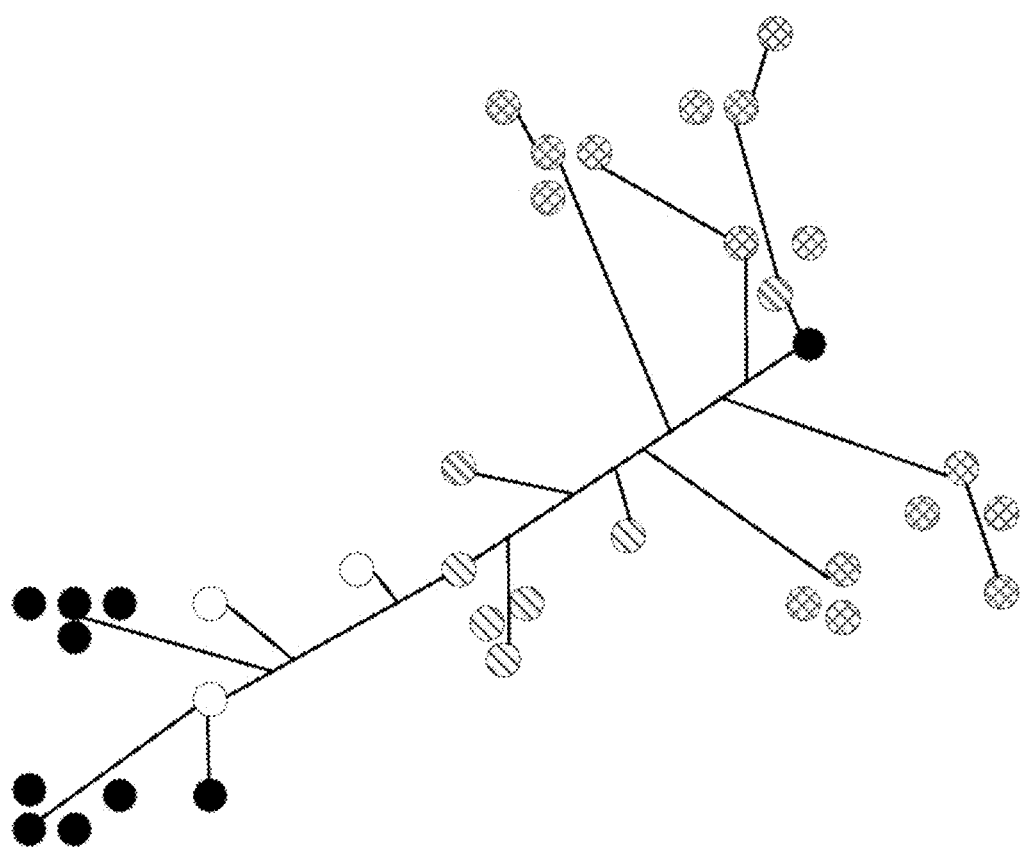

Table 1:

| Scenario | Categorized Effect | Customer Service Cyber Strand | |
|---|---|---|---|
| | | Liklihood | Impact |
| 1 | Message Manipulation | .80 | .03 |
| 2 | External Denial of Service | .65 | .25 |
| 3 | Internal Denial of Service | .25 | .45 |
| 4 | Data Attack | .30 | .80 |
| 5 | Physical Attack | .01 | .67 |
| 6 | Exploitation of Sensors | .55 | .01 |
| 7 | Exploitation of End Hosts | .75 | .40 |
| 8 | Exploitation of Network Infrastructure | .89 | .05 |
| 9 | Exploitation of Application Server | .45 | .85 |
| 10 | Exploitation of Data in Transit | .02 | .74 |

Fig. 7

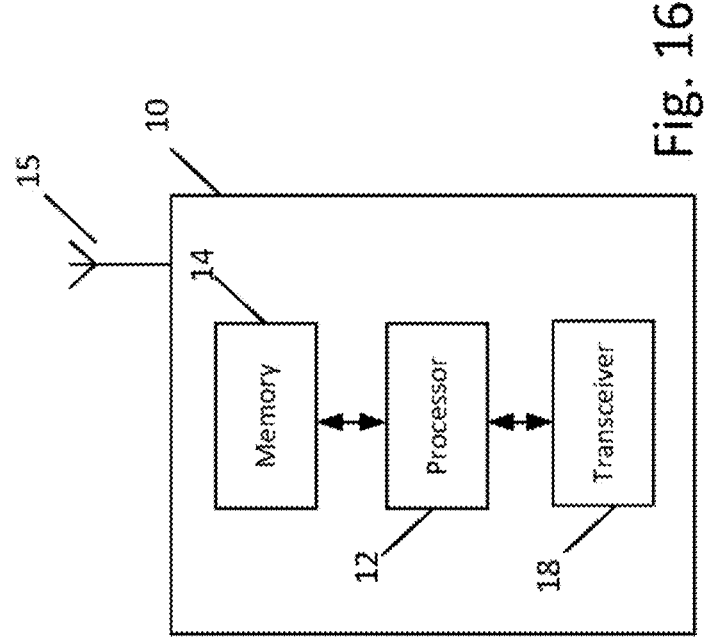

SYSTEM AND METHOD FOR ASSESSING, MEASURING, MANAGING, AND/OR OPTIMIZING CYBER RISK

CROSS-REFERENCE TO RELATED APPLICATIONS

This application claims priority from U.S. Provisional Patent Application No. 62/811,329 filed on Feb. 27, 2019. The contents of this earlier filed application are hereby incorporated by reference in their entirety.

FIELD

Some example embodiments may generally relate to cyber risk. For example, certain embodiments may relate to systems and/or methods for assessing, measuring, managing, and/or optimizing cyber risk.

BACKGROUND

Cyber attacks target computers and/or networks. The goal of a cyber attack may be to inhibit operations of the target computers and networks, to access and/or steal data from the computers and/or networks, and/or the like. Cyber attacks can involve the use of viruses, worms, Trojan horses, denial of service attacks, and/or the like.

SUMMARY

According to a first embodiment, a method for cyber risk analysis may include generating, by a computing device, a cyber strand based on input related to an organization. The cyber strand may identify one or more devices in a network topology. The method may include generating one or more scenarios for the cyber strand. The method may include measuring an impact of each of the one or more scenarios on the cyber strand. The method may include generating a risk score for the each of the one or more scenarios based on the impact of the each of the one or more scenarios. The method may include generating output based on the risk score for the each of the one or more scenarios.

In a variant, the input may comprise information that identifies the one or more devices and the network topology. in a variant, the network topology may be associated with a function of the organization. In a variant, measuring the impact may comprise calculating an index that indicates a severity of a disruption to the each of one or more devices caused by one or more events associated with the each of the one or more scenarios. In a variant, calculating the index may further comprise calculating the index based on information that identifies an importance of the each of the one or more devices, an eigenvector score for the each of the one or more devices, a disruptive impact score for the each of the one or more devices, and a period of time associated with each of the one or more scenarios.

In a variant, measuring the impact may further comprise calculating an index that indicates a severity of an exploitation of data from the one or more devices resulting from one or more events associated with the each of the one or more scenarios. In a variant, calculating the index may comprise calculating the index based on weighted sums of customer data, organizational data, and intellectual property data lost across a subset of the one or more devices during the each of the one or more scenarios. In a variant, generating the risk score may comprise generating the risk score by multiplying a first index and a second index by a likelihood of one or more events associated with the each of one or more scenarios. In a variant, the first index may indicate a severity of a disruption to the one or more devices. In a variant, the second index may indicate a severity of an exploitation of data from the one or more devices.

According to a second embodiment, an apparatus for cyber risk analysis may comprise at least one processor and at least one memory including computer program code. The at least one memory and the computer program code may be configured to, with the at least one processor, cause the apparatus at least to generate a cyber strand based on input related to an organization. The cyber strand may identify one or more devices in a network topology. The apparatus may generate one or more scenarios for the cyber strand. The apparatus may measure an impact of each of the one or more scenarios on the cyber strand. The apparatus may generate a risk score for the each of the one or more scenarios based on the impact of the each of the one or more scenarios. The apparatus may generate output based on the risk score for the each of the one or more scenarios.

In a variant, when generating the one or more scenarios, the apparatus may generate the one or more scenarios based on information that identifies a subset of the one or more devices impacted by one or more events associated with the each of the one or more scenarios and information that categorizes an effect of each of the one or more events. In a variant, the first index may indicate a severity of a disruption to the one or more devices. In a variant, the second index may indicate a severity of an exploitation of data from the one or more devices.

In a variant, when generating the one or more scenarios, the apparatus may generate the one or more scenarios based on information that identifies a likelihood of occurrence of the each of the one or more events. In a variant, the apparatus may determine a likelihood for the each of the one or more scenarios by determining a mean likelihood and a standard deviation of the mean likelihood for the each of the one or more events. In a variant, when generating the risk score, the apparatus may generate the risk score by multiplying the first index for each of the one or more events and the second index for the each of the one or more events by the likelihood for the each of the one or more events.

In a variant, the apparatus may determine a value of a loss resulting during the each of the one or more scenarios. In a variant, when generating the output, the apparatus may generate the output to include information identifying the value of the loss. In a variant, when determining the value of the loss, the apparatus may determine the value of the loss based on information that identifies a use of the one or more devices in production of a good or service, a production resulting from the use of the one or more devices, or a value of the goods or services produced from use of the one or more devices. In a variant, when determining the value of the loss, the apparatus may determine the value by multiplying the production or the value of the goods or services by the risk score.

According to a third embodiment, a non-transitory computer readable medium may comprise program instructions for causing an apparatus to perform at least generating a cyber strand based on input related to an organization. The cyber strand may identify one or more devices in a network topology. The apparatus may perform at least generating one or more scenarios for the cyber strand. The apparatus may perform at least measuring an impact of each of the one or more scenarios on the cyber strand. The apparatus may perform at least generating a risk score for the each of the one or more scenarios based on the impact of the each of the one or more scenarios. The apparatus may perform at least generating output based on the risk score for the each of the one or more scenarios.

In a variant, when measuring the impact, the apparatus may perform at least measuring the impact by calculating a first index and a second index. In a variant, the first index may indicate a severity of a disruption to the one or more devices caused by one or more events associated with the each of the one or more scenarios. In a variant, the second index may indicate a severity of exploitation of data from the one or more devices resulting from the one or more events.

In a variant, when calculating the first index and the second index, the apparatus may perform at least calculating the first index based on a sum of a weight for each of the one or more devices and an eigenvector score for the each of one or more devices and based on a product of the sum and a disruptive impact score and based on the product divided by a period of time. In a variant, the apparatus may perform at least calculating the second index based on weighted sums of customer data, organizational data, and intellectual property data lost across a subset of the one or more devices during the each of the one or more scenarios.

In a variant, when generating the risk score, the apparatus may perform at least generating the risk score based on determining a product of multiplying the first index and the second index by a likelihood of each of the one or more events. In a variant, when generating the output, the apparatus may perform at least generating the output, wherein the output comprises at least one of: a risk map or a surface map. In a variant, the apparatus may perform at least determining a value of a loss resulting from the each of the one or more scenarios.

A fourth embodiment may be directed to an apparatus including at least one processor and at least one memory comprising computer program code. The at least one memory and computer program code may be configured, with the at least one processor, to cause the apparatus at least to perform the operations according to the first embodiment, the second embodiment, or the third embodiment, or any of the variants discussed above.

A fifth embodiment may be directed to an apparatus that may include circuitry configured to perform the operations according to the first embodiment, the second embodiment, or the third embodiment, or any of the variants discussed above.

A sixth embodiment may be directed to an apparatus that may include means for performing the operations according to the first embodiment, the second embodiment, or the third embodiment, or any of the variants discussed above.

A seventh embodiment may be directed to a computer readable medium comprising program instructions stored thereon for performing at least the operations according to the first embodiment, the second embodiment, or the third embodiment, or any of the variants discussed above.

An eight embodiment may be directed a method for performing the operations of the first embodiment, the second embodiment, or the third embodiment, or any of the variants discussed above.

A ninth embodiment may be directed to a computer program product encoding instructions for performing at least the operations according to the first embodiment, the second embodiment, or the third embodiment, or any of the variants discussed above.

BRIEF DESCRIPTION OF THE DRAWINGS

For proper understanding of example embodiments, reference should be made to the accompanying drawings, wherein:

FIG. 2 illustrates an example of a cyber strand, according to some embodiments;

FIG. 3 illustrates an example of a network topology color-coded by organization unit, according to some embodiments;

FIG. 7 illustrates a table 1 of example scenarios by cyber strand, according to some embodiments;

FIG. 16 illustrates an example block diagram of an apparatus, according to an embodiment.

DETAILED DESCRIPTION

Figure 1A:
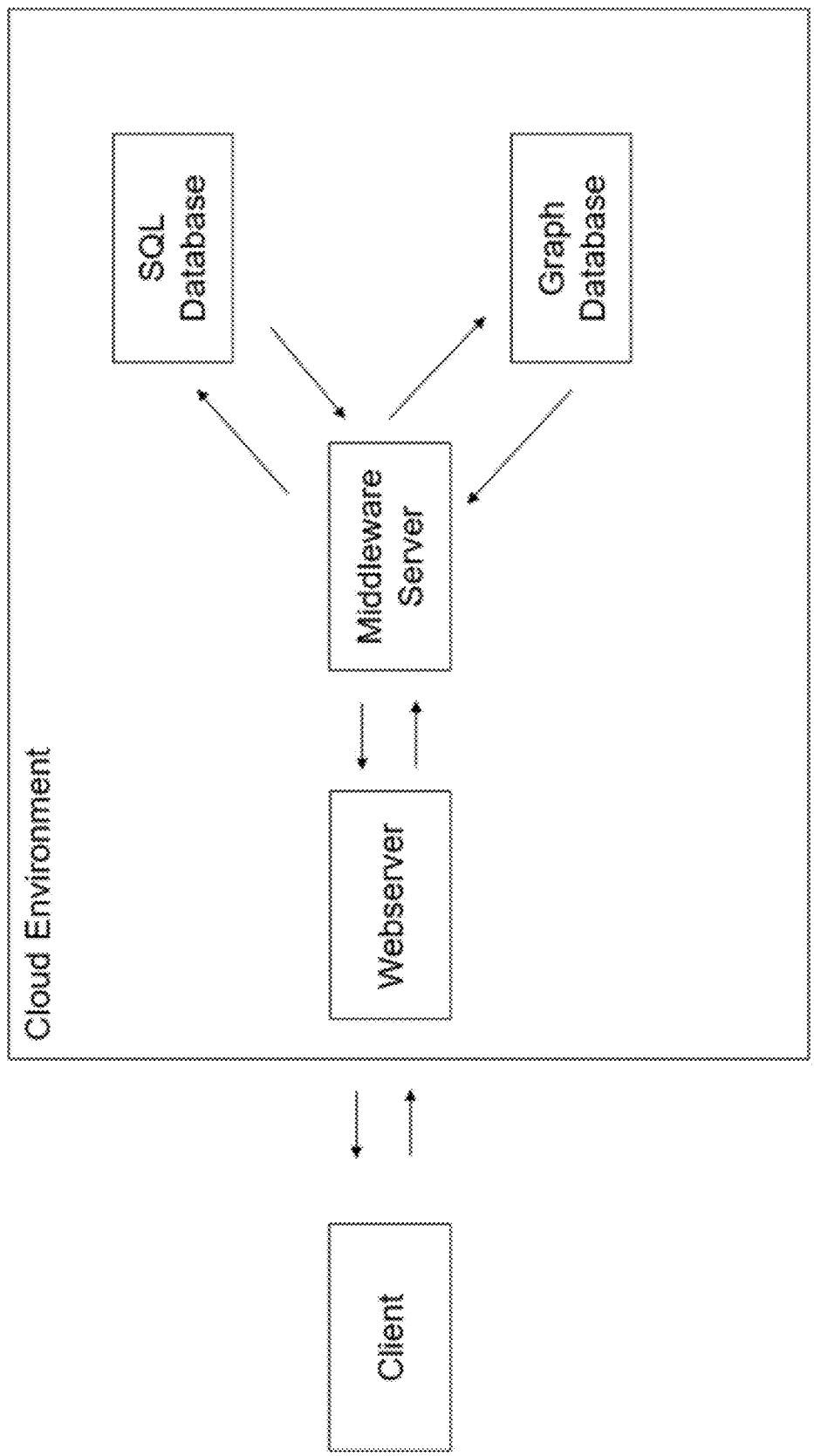
FIG. 1a illustrates an example architecture diagram, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for assessing, measuring, managing, and/or optimizing cyber risk is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

The new U.S. National Cyber Strategy states that government officials will be held accountable for conducting cyber risk management as directed by the National Institute of Standards and Technology (NIST), the Center for Internet Security (CIS), and the Information Systems Audit and Control Association (ISACA) policy documents and best practice guides, yet none of the necessary analytical tools have been provided.

Given the frequency and diversity of cyber events, trying to prevent them all would be expensive and unnecessary since the most common types of cyber-attacks often have trivial, if annoying, effects. In reality, preventing all cyber events would be impossible. A risk-centric approach lets organizational leaders and policymakers be strategic about mitigation options and resource allocations. It also enables them to have more productive discussions about which types of cyber risks are purely private matters, which types are best reduced through voluntary cooperation between public and private sector actors, and which types would have severe enough consequences outside of the target organization that the government should play a leading role in prevention and response.

The first major effort to provide guidance on cybersecurity risk assessment was part of the Information Security Management System published by the International Standards Organization and the International Electrotechnical Commission in 2005. That set of guidance—ISO/IEC 27001 (updated in 2013)—directs managers to systematically assess their organization's information security risks by evaluating threats, vulnerabilities, and impacts, but does not describe how to take these prescribed actions.

A range of private sector efforts, including ISACA's Control Objectives for Information and Related Technologies (COBIT) 5 standard and the CIS's security controls, have also attempted to lay out and frame risk as a central feature of effective cyber defense. These methods incorporate best practices and provide checklists to ensure information security professionals have industry guidelines in view when securing their networks. The outgrowth of industry standards, guides, and recommendations increased substantially over the past decade driven by the ever-increasing volume, veracity, and magnitude of cyber incidents. The range of guidance, which was often disperse or subject to its own nomenclature, was eventually grouped and referenced under Obama administration efforts to define cybersecurity best practices in critical infrastructure.

The NIST Cybersecurity Framework, first released in 2014 and revised in April 2018, is an umbrella document that serves as the standard for cybersecurity in the U.S. Executive Branch and is widely used by other organizations. It covers five categories of functional activities to improve cybersecurity. Risk identification and management are in the "Identify" (ID) category, and recommended activities include assessing vulnerabilities and collecting information about threat actors' motives and capabilities. Identification of business impacts and their likelihoods—used to determine risk to the organization—are discussed in the fourth area of the NIST "Risk Assessment" subcategory.

The NIST Standard Framework specifies several principles for systematic risk assessment: assess the potential consequences that could result from specific threats, assess the realistic likelihood of those threats to engineer the consequences identified, assess risk by asset, organization, function, and integrated risk between firms, generate scenario-based use cases in estimating risk, and define a consistent approach to be used across the organization. The framework directs users to the aforementioned best-practice guides for help in figuring out how to implement these principles in a way that suits their organization's mission and information technology (IT) infrastructure. Anyone who tries to use these guides to do that, though, is likely to become frustrated. The guides focus upon assessing how specific threats to individual IT assets could directly impact an organization's operations and data security. The representation is static and does not conceptualize individual assets as part of a deeply interconnected IT system where a disruption in one component could indirectly impede operations supported by a different part of the IT system, thus producing a wave effect of impact. In actual practice, these kinds of events produce a lengthy list of devices with vulnerabilities that may have to be addressed. The challenge is being unable to understand, for example, that the problem with router A should be prioritized over a different problem with router B because router A is a central node for many devices used to manufacture the organization's most important product, while router B supports a subset of the computers used for human resource functions.

The guides also treat adverse effects of cyber events as a diverse, but undifferentiated, category of bad consequences. For example, ISO 27001 lists various things that organizational leaders might care about, including revenue loss or reputational damage, decline in stock value, or higher insurance costs. Each of these effects, and many more, may be important for risk assessment, but some matter more to an organization's Chief Information Officer than its Chief Executive Officer, while others may be more important to somebody selling cyber insurance, relying on the organization for key goods or services, or overseeing the critical infrastructure sector to which this organization belongs. NIST SP 800-53 directs users to consider "tiers of impact" but does not provide a way to assess how vulnerabilities in one part of an interconnected IT network can create risks in other parts of the organization's IT system, its supply chain, or its community.

In addition, existing best practice guides direct IT managers to estimate the potential consequences of an attack on different parts of their network as if the consequences of different types of attacks on the same device would all be the same, and often also as if the event would have the same effects on every device of that type regardless of what its role is in the organization's IT system. For example, NIST SP 800-30, "Risk Management Guide for Information Technology Systems," suggests estimating the severity of an actual or potential incident as having high, medium, or low impact on the confidentiality, integrity, and accessibility of the targeted system. Risk assessment is then mapped by creating a grid with columns for these three dimensions and one or more rows for different types of devices, such as workstation computers, routers, and servers.

Clearly, though, an exploitative attack on a file server could have high impact on confidentiality and low impact on integrity and accessibility, while a disruptive attack on that same server might have low impact on confidentiality and integrity, and a medium or high impact on accessibility. Likewise, an exploitative event targeted on an individual workstation could be embarrassing for the employee targeted but would be unlikely to have high impact on any dimension for the organization as a whole unless the workstation belonged to a particularly important person or somebody who worked with particularly sensitive information. This illustrates the utility of scenario-based risk estimates that take into account how specific IT components relate to each other and support different parts of an organization's operations. From this, there is a clear need for a risk framework that is more nuanced than the techniques described above.

Some embodiments described herein may provide a computing device (e.g., a server device) capable of assessing, measuring, managing, and/or optimizing cyber risk. For example, certain embodiments described herein can guide risk assessment for individual organizations and for integrated elements of critical infrastructure. Certain embodiments may provide features that make it possible for policy makers and organizational leaders to assess a range of risks introduced by threat actors: a standardized system for classifying cyber threats and events by their effects, tools to associate organizational functions with IT network maps or topologies, operations to assess the severity of disruptive and exploitative cyber events, and operations to understand the integrated nature of risk across different parts of an organization, across divisions in the organization, or to display the interconnectedness of organizations in a complex system.

With these capabilities, certain embodiments may be able to assess integrated risk across departments, processes, organizations, and/or critical infrastructure. This approach may specifically addresses the major points raised in the U.S. National Cyber Strategy and may complement, rather than replace, existing policy and best practice standards by making it easier to do what is recommended. Certain embodiments may utilize scenario-based operations that are modularized to provide a set of tools and techniques that enable integrated risk mapping within a single organization or across multiple organizations comprising a certain infrastructure sector. Using comprehensive, consistent, and repeatable operations to measure risk can may improve communication, decision-making, and/or cooperation among officials and executives who make policy decisions and the IT staff and critical infrastructure operators who have day-to-day responsibility for cybersecurity.

To address the inability of organizations and governments to measure risk across a range of cyber effects, certain embodiments may utilize an effects-based approach to categorize, measure, and assign risk to different parts of the organization. Each feature can be combined with others to compare side-by-side, or to arrange in a process flow diagram, and tied to an output to generate monetary impacts to the organization. Certain embodiments may use one or more cloud-hosted servers including: a web server to enable user interaction, a middleware server programmed in, for example, C # or another programming language, to facilitate access between the user interface and data stores and to calculate cyber attack effects, and both a structured query language (SQL) database or data store (or based on another type of language) and a graph database or data store to store details about specific devices and their topologies. These devices are illustrated in the example architecture diagram illustrated in FIG. 1a.

Figure 1B:
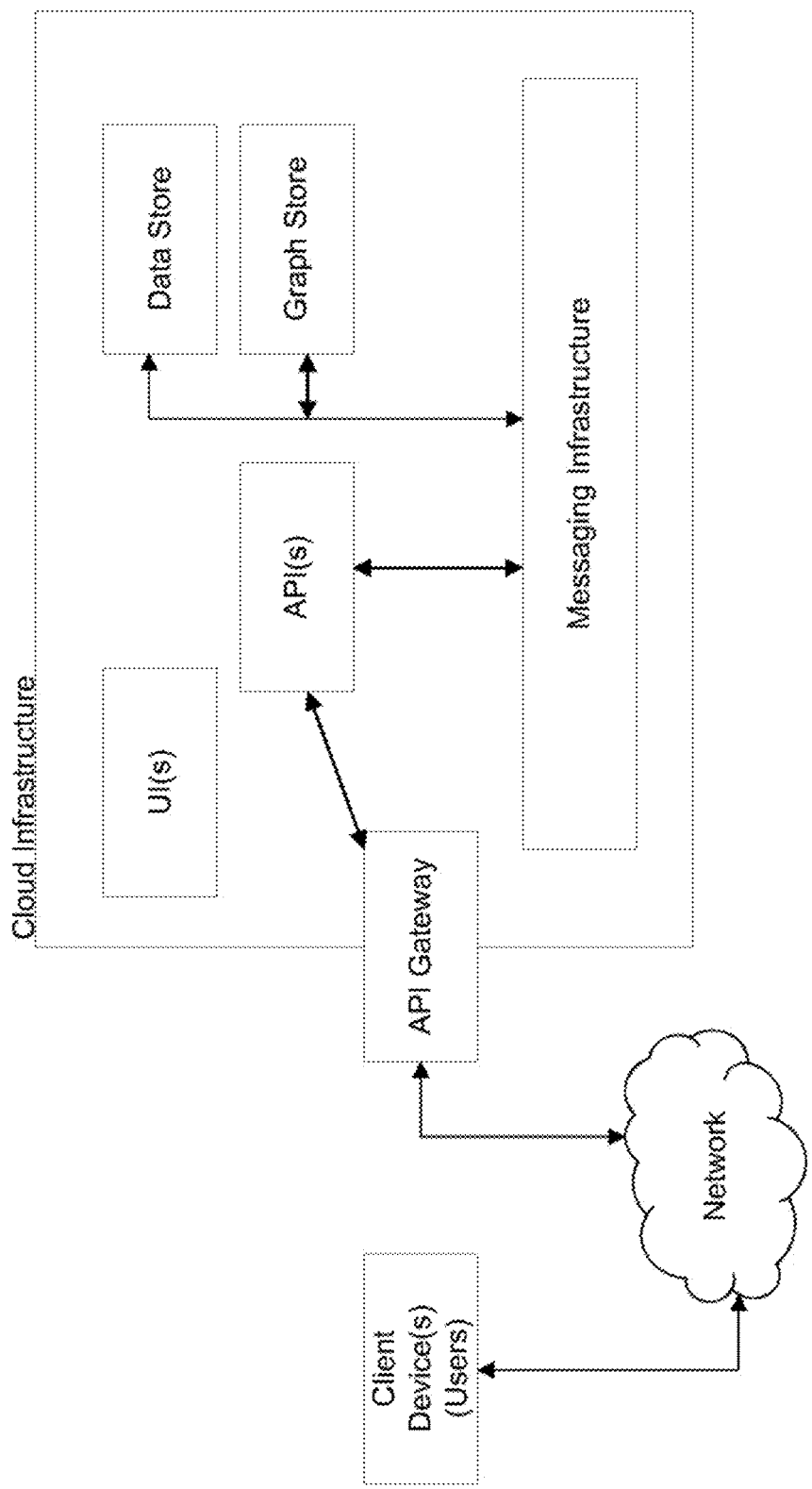
FIG. 1b illustrates another example architecture diagram, according to some embodiments.

FIG. 1b illustrates another example architecture diagram, according to some embodiments. As illustrated the architecture may include one or more client devices (e.g., utilized by users of a system described herein) connected to a network (e.g., the Internet, an intranet, a Third Generation Partnership Project (3GPP) long-term evolution (LTE) network (e.g., a 4G network, a 5G network, etc.), and/or the like. The network may be connected to a cloud infrastructure (e.g., that includes one or more server devices described herein). The cloud infrastructure may include an application programming interface (API) gateway that can be used to access the cloud infrastructure. In addition, the cloud infrastructure may provide one or more user interfaces (UI(s)) that can be provided for display via the one or more client devices, which can be used to access functionality of a system described herein. The cloud infrastructure may include one or more APIs (e.g., one or more elastic APIs) for accessing other elements of the cloud infrastructure. The cloud infrastructure may include a messaging infrastructure (e.g., a messaging fabric) that can be used to communicate with elements of the cloud infrastructure. The cloud infrastructure may include a data store, a graph store, and/or the like, as described elsewhere herein, to store information.

Certain embodiments may use the following operations: break down network maps into sub topologies and into functionally assigned topologies known as "cyber strands"; generate scenarios against each cyber strand categorized by a standard taxonomy of effect; calculate the severity of impact using two calculated indexes: the Cyber Disruption Index (CDI) and the Cyber Exploitation Index (CEI); estimate, present, and visualize, risk across individual cyber strands or combined in "risk fabrics"; and/or allow users to create process flows, or "cyber threads," by combining cyber strands and generating information about financial losses incurred for each scenario which, when combined, displays the distribution of financial loss for the firm.

Figure 1C:
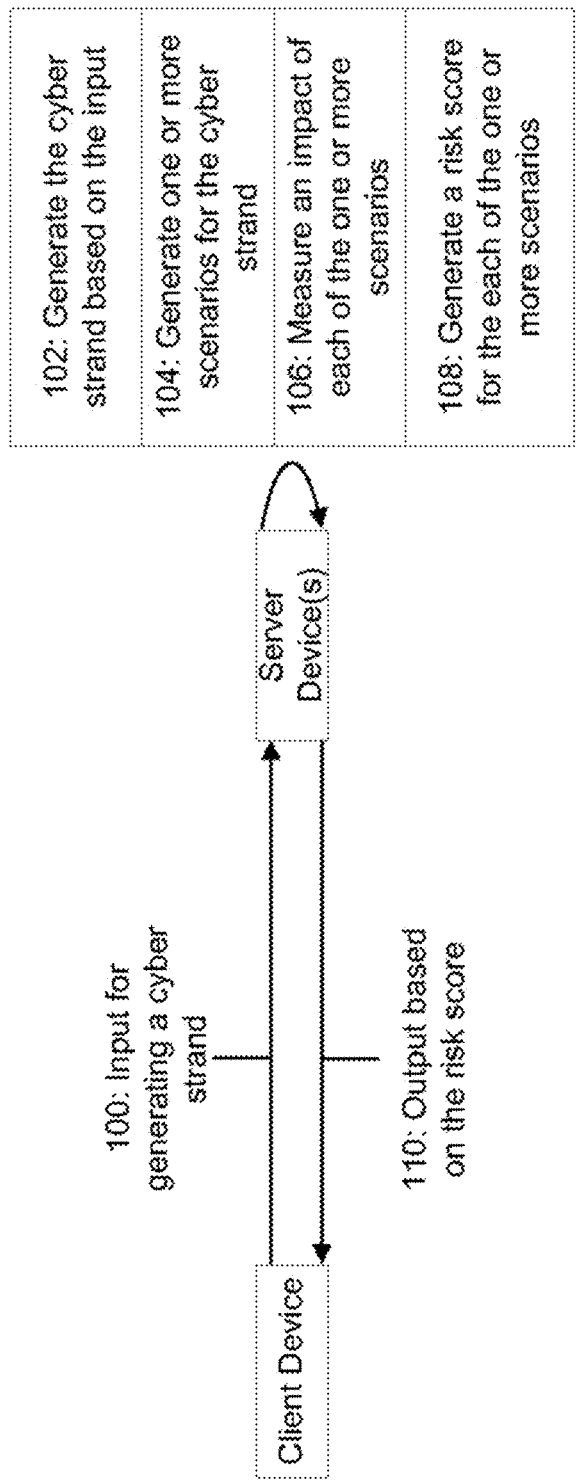
FIG. 1c illustrates an example of assessing, measuring, managing, and/or optimizing cyber risk, according to some embodiments.

FIG. 1c illustrates an example of assessing, measuring, managing, and/or optimizing cyber risk, according to some embodiments. Users of the system may cause the system to ingest technical information obtained from scans, such as Network Mapper (NMAP) or Open Vulnerability Assessment Scanner (OPENVAS). The scanned devices may carry details about their network information (Internet Protocol (IP) address, medium access control (MAC) address, etc.), operational software (operating system (OS) version or software installed), and vulnerabilities tied to each device. The scanned devices can be combined by the users into functional topologies of networked devices that are tied to the organizational functions. Devices selected in each strand also may include data obtained in ingested system scans received from NMAP or OPENVAS. These might include: host names, IP addresses, MAC addresses, Operating Systems, and known vulnerabilities. Tying technical details of specific devices to graph structures associated with a mission function may allow users to prioritize specific vulnerabilities for technical remediation. FIG. 1c illustrates a client device and one or more cloud server devices in communication with each other. As illustrated at 100, a client device may provide, and the one or more server devices may receive, input for generating a cyber strand. For example, users may define the sub topologies of their network and may assign them to specific organizational functions called "strands." A strand may be a feature in certain embodiments that allows users to build more complex structures against an array of effects engineered against that organization. Strands may be created through interaction with a web enabled graphical user interface, where users select devices and connect them together in a network map. Nodes and graph structures may be stored in a cloud hosted graph data store, with information tied to the individual devices stored in a traditional SQL data store.

FIG. 2 illustrates an example of a cyber strand, according to some embodiments. In the example of FIG. 2, an example of a strand may comprise four devices, illustrated by the four different colored circles, connected together. A device may include a laptop, a router, a server, or any type of mobile computing or sensor device. Once a strand is established, users of the client device may input information to the client device to develop attack scenarios against specific strands utilizing a standardized effects taxonomy, with the effects measurements being calculated through two different scoring calculations. The CDI and the CEI may be graph-based calculations that may generate a value ranging between 0 and 1 that, when combined with a likelihood value, may provide a risk score for specific scenarios against the strand. The CDI and CEI are described elsewhere herein. Unlike conventional approaches to measuring cyber risk, certain embodiments may not assume a hacker's effect is against a unitary device in a network, but rather may build graphs of services that allow users to identify a range of scenarios and effects against a complex system. Risk may, therefore, be computed against a collection of interconnected devices with the impacts weighted by their interconnections. Further, risk scores may be categorized by their generalized end effect allowing users to view a range of risk scores for a set of interconnected devices tied together in support of an organizational function. Changes to a scenario may cause the system to recalculate the value of risk based on the new input parameters.

The effect calculations may be developed for one or more scenarios in a strand, where a scenario may be categorized by a standard taxonomy of effect. The resulting range of effects for each scenario may provide the user with a much more nuanced understanding about which attacks may be relatively minor and which may present a major problem. For example, a marketing department may have six computers working together that are connected by a router and may be utilizing an email server. A hacker may choose to attack that organization in a variety of ways, each of which may have different impacts to the organization. The hacker may choose to steal company data from one of the marketing computers, drop ransomware onto the email server, or destroy the firmware on one or more of the devices. Each attack may have a different impact that may be calculated and visualized for the user either as part of a single strand, a user defined block referred to as a fabric, or as part of a process function referred to as a thread.

As such, certain embodiments may combine one or more of four major concepts together: a systems approach to measuring effect; standardized effects categorization; one or more ways of measuring severity of impact to IT infrastructure; and/or a method to transform IT infrastructure effects into impacts on organizational processes or production. By taking a features-based approach to estimating impacts in small systems, certain embodiments may enable users to combine units to create a variety of structures in which risk may be measured and visualized. Users may create, edit, and store cyber strands allowing them to manage a large number of graph topologies with cyber scenarios categorized by end effect allowing for a more nuanced view of organizational risk Returning to FIG. 1c, as illustrated at 102, the one or more server devices, hosted in multiple cloud environments, may generate the cyber strand based on the input (e.g., input related to an organization). Those servers may include a web server, a SQL data store, a graph data store, and a middle ware service, utilizing, for example, the C # programming language, used to act as the middle layer between the web server front end and the SQL and graph data stores. In some embodiments, the cyber strand may identify one or more devices in a network topology. Measuring cyber security risk in networks may utilize one or more operations or features. For example, certain embodiments may use the concept of a "cyber strand." A cyber strand may include a user-defined, node edge graph that represents an organizational function. In utilizing a cyber strand, certain embodiments may be capable of breaking down a single large network map, which may include thousands of devices and connections, into smaller units that can be more systematically analyzed for the risk posed to the institution.

For example, FIG. 3 illustrates an example of a network topology color-coded by organization unit, according to some embodiments. Specifically, FIG. 3 illustrates a representative node edge map color coded by department. Black nodes may represent devices used by one department, white another, etc. If a fictional company—ACME Corporation—used this network for its operations, certain parts of the network may only be used for specific purposes. For example, customer services may use one part of the network, logistics may use another part of network, and manufacturing may use yet another part the network. In this way, breaking down the larger network may be useful in assessing which organizational processes are prone to specific cybersecurity threats. To create these smaller units, the one or more server devices may generate topologies utilizing the devices associated with completing a task. An organizational function, such as taking a customer order, may include the computers used by customer service employees, but may also include routers, switches, and application servers that enable the customer service employees to take and enter and process those orders.

Figure 4:
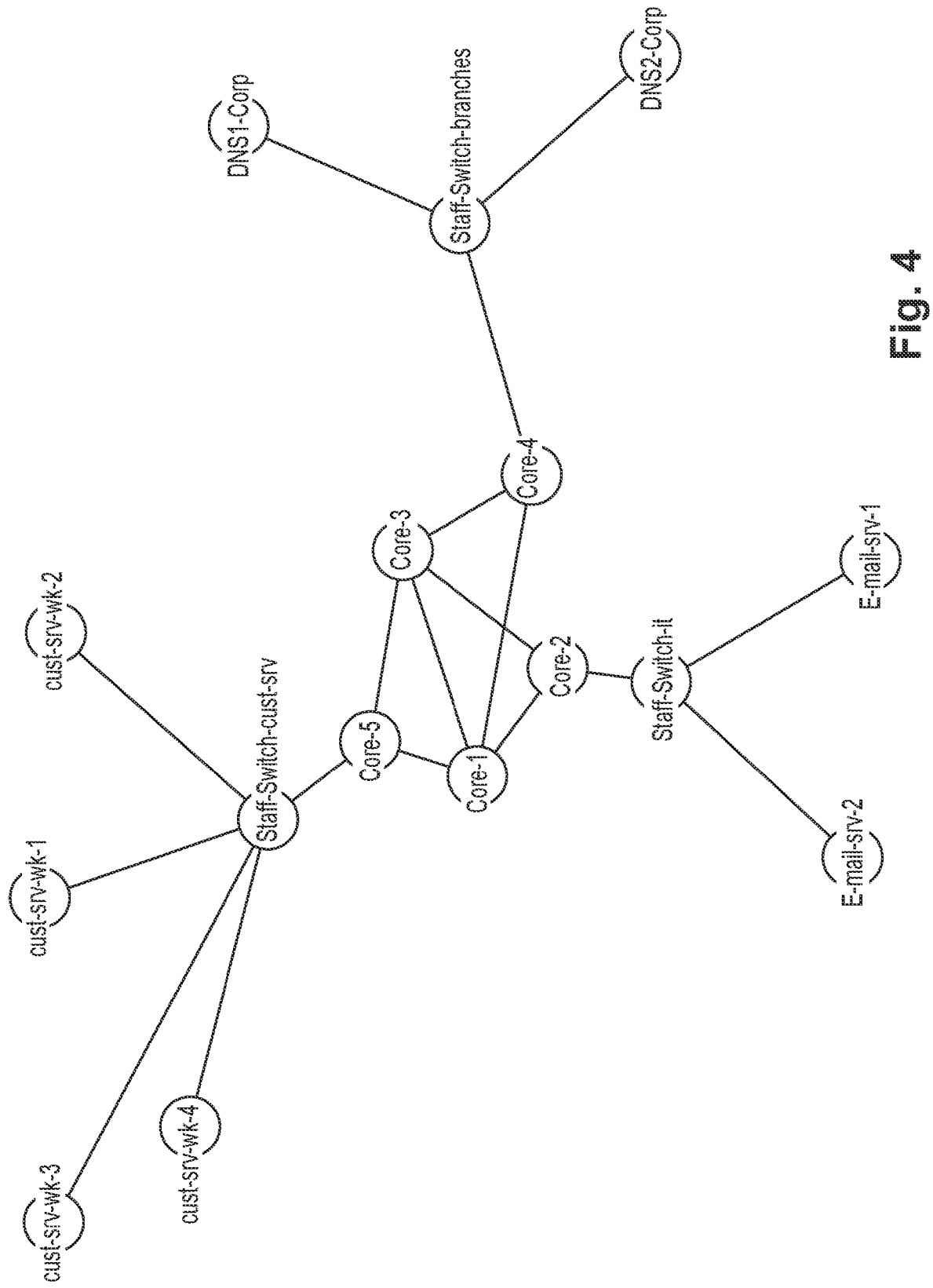
FIG. 4 illustrates an example of a customer orders cyber strand, according to some embodiments.

For example, assume that the ACME Corporation manufactures widgets. In this example, orders may be taken by customer service representatives, who may have to record the details of those orders and send them to a fulfillment center. Continuing with this example, computers used by the customer service department, coupled with the routers, email servers, and the domain name servers, may be used in the execution of that organizational function. Drawing out that sub topology, FIG. 4 illustrates an example of a customer orders cyber strand that the one or more server devices may generate, according to some embodiments. Specifically, FIG. 4 illustrates a network map of the specific organizational function tied to taking customer orders for the ACME Corporation. This is an example of how certain embodiments may define a cyber strand.

The cyber strand illustrated in FIG. 4 may represent one feature in certain embodiments' ability to define risk in an organization. The one or more server devices may assess scenarios against specific functions and their underlying IT infrastructure, which may be operating within a system. This approach may assume that the end goal of the hacker may be to institute effects on a single device or on multiple devices. Categorizing those effects, measuring their severity and likelihood, and calculating and visualizing the risk by organizational process may be a process utilized by certain embodiments.

Figure 5:
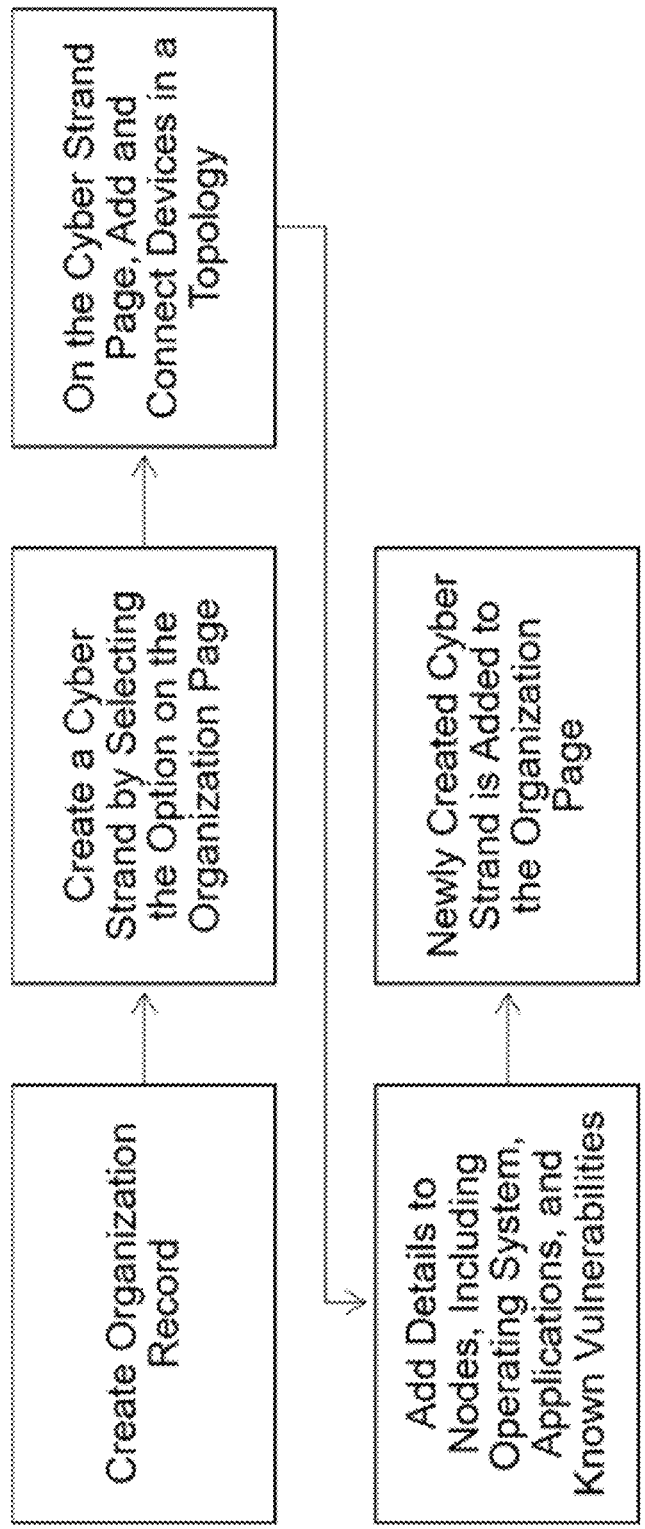
FIG. 5 illustrates an example process for creating a cyber strand, according to some embodiments.

To build a cyber strand, an organization record may be created, including details surrounding its industry, address, website, and other descriptive data. A user may create a cyber strand by selecting one or more appropriate menu options provided for display by the one or more server devices, such as via a webpage. The web interface may allow a user to create a cyber strand name Next, the webserver may interact with the application server acting as middleware and the SQL and graph store to provide the user with a digital workspace on the webpage or other user interface to create, name, and connect devices in a topology associated with the named cyber strand. Once created, the middleware server may update the SQL and graph devices may update an organization record and may present the user with all of the strands the user has created. These operations are illustrated in FIG. 5, which illustrates an example process for creating a cyber strand, according to some embodiments. As illustrated in FIG. 5, certain embodiments provide for a user to define any number of systems for which they need to measure risk. Each cyber strand, therefore, may become a unit of measurement with respect to certain embodiments. The web server may allow multiple cyber strands to be combined to display integrated risk across any number of selected strands. The one or more server devices may generate multiple scenarios, with or without user input, for each strand, where the web server, middle ware application, and SQL and graph data store may asses an impact on devices of the network topology and/or an organization for each scenario, and may combine results for multiple cyber strands to determine contours of risk in differing parts of the organizational network or even between organizations.

The cyber strands generated with respect to certain embodiments may allow users to define scenarios in which hackers can have effects against any number of the nodes defined in the strand. Certain embodiments may then define a severity of impact and likelihood of each scenario as a way of providing a range of impacts to specific organizational functions and/or to the company as a whole. The categorization and ways of measuring severity are described elsewhere herein.

Returning to FIG. 1*c*, the one or more server devices may allow users, at 104, to generate one or more scenarios for the cyber strand. The scenario is not specific to any one particular technical vulnerability but may allow the user to blend existing tools or knowledge to assess impact on a defined organizational process tied to IT infrastructure. Certain embodiments may utilize the concept of a cyber event. For example, a cyber event may be defined as the result of any single unauthorised effort, or the culmination of many such technical actions, that threat actors, through use of computer technology and networks, may utilize to create a desired primary effect on a target (e.g., a device or network).

For example, if a hacker uses a spear phish email to gain access to a network and then laterally moved through the network to delete data on five computing devices, then that may be considered a single event type where the primary effect resulted in the destruction of data. This encapsulation of hacker tactics and tradecraft into specification of the primary effect of those actions may be what is defined as a cyber event. Cyber events may be the end result of one or more scenarios applied to specific cyber strands by certain embodiments. A cyber strand, therefore, may be associated with multiple scenarios impacting the data contained in, or operations conducted by, a network topology.

The one or more server devices, in certain embodiments, may leverage a cyber effects taxonomy to direct categorization of effects of a cyber event. Effects of cyberattacks may be multifaceted and, certain embodiments may allow a user to define scenarios in which the user can bin an attack within multiple categories of impact, for example, 10 different categories of impact.

Figure 6:
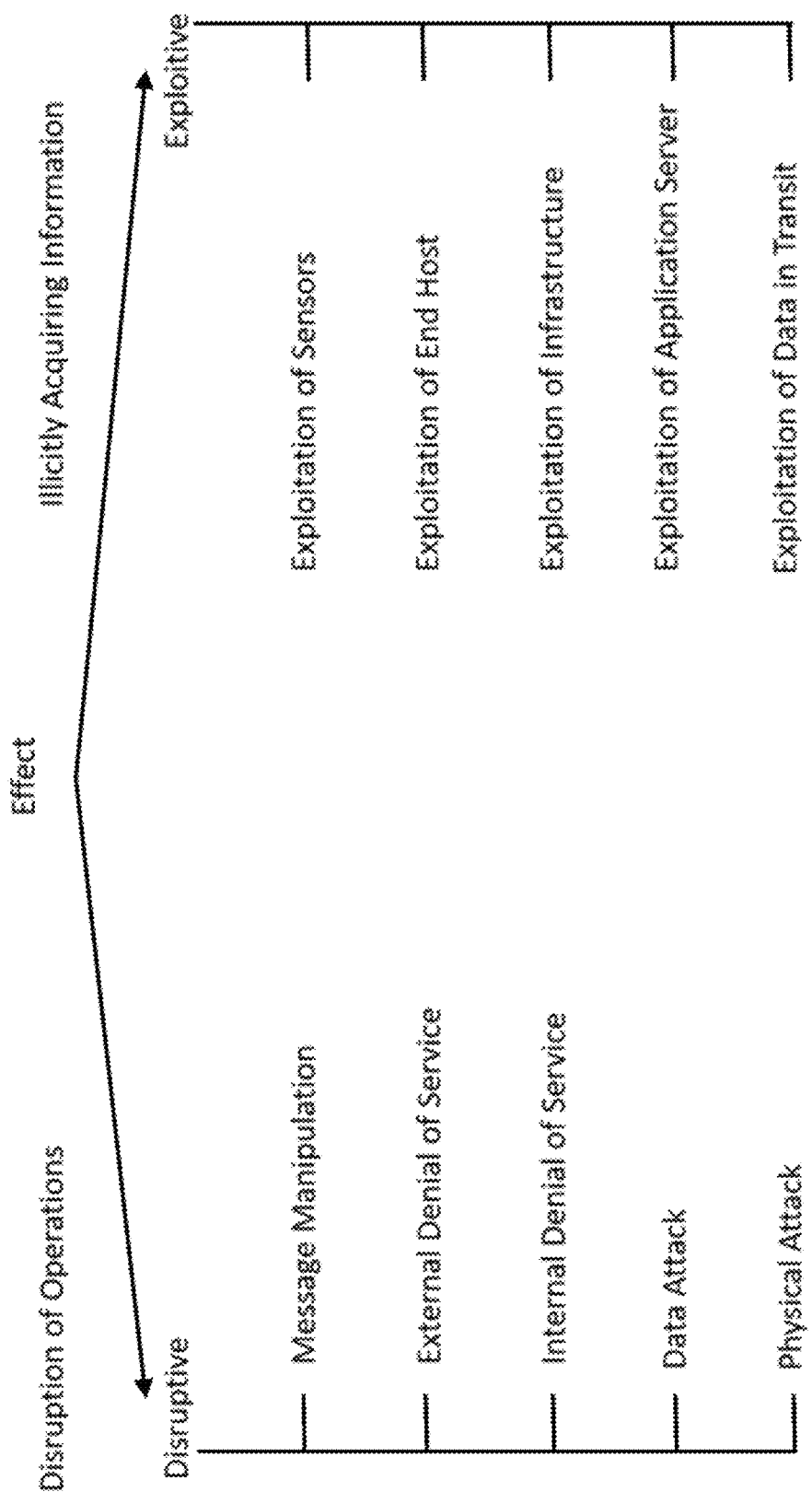
FIG. 6 illustrates an example effects taxonomy, according to some embodiments.

FIG. 6 illustrates an example effects taxonomy, according to some embodiments. As FIG. 6 illustrates, any given cyber event can have one or more of two types of primary effects (objectives): the disruption of the target organization's operations/functions, or the illicit acquisition of information. For example, an attacker may disrupt an organization's ability to make products, deliver services, carry out internal functions, or communicate with the outside world in several ways. Alternatively, hackers may seek to steal credit card user accounts, intellectual property, or sensitive internal communications to get financial or other benefits without disrupting the organization.

Users of the client may be capable of accessing a user interface provided for display by the one or more server devices to create one or more scenarios for a cyber strand. For example, the one or more server devices may provide a cyber strand page for display and the users may create scenarios on the cyber strand page by, for example, creating a name, selecting devices impacted, and categorizing the effect of the attack based on the taxonomy illustrated in FIG. 6. The one or more server devices may add the scenarios to a table on the cyber strand page highlighting (in the visualization of the cyber strand) each device impacted by the user-defined scenario. Since certain embodiments may utilize a cyber event categorization broadly grouped between exploitive and disruptive effects, the one or more server devices may, for each scenario defined by its category, prompt the user for information about localized impacts to particular devices or sub-networks of the network topology.

The one or more server devices may, for disruptive scenarios, prompt the user to supply one or more pieces of information for each node impact. As a first example, the one or more server devices may prompt the user for input of a numeric value that indicates a level of impact to the productivity of each impacted node (e.g., the numeric value may range from 0 (indicating no impact to device operations) to 1 (completely impacted)). As a second example, the one or more server devices may prompt a user to input a length of time each node is impacted by the disruption (defined in hours, minutes, days, weeks, etc.).

The one or more server devices may use a graph weighting, described elsewhere herein, for the node in the cyber strand and may utilize the user provided information for duration and productive impact to define an overall impact score for a scenario. For exploitive scenarios, the one or more server devices may prompt the user to input a quantity (e.g., in terms of megabytes, gigabytes, quantity of files or documents, etc.) of data lost for each node in the cyber strand. The quantity of data may be categorized into one or more types. For example, the data may be categorized as organizational data (e.g., e-mails, memos, etc.), intellectual property data (e.g., product design documents, proprietary information, etc.), and customer data (e.g., customer names, home or work addresses, email addresses, payment information, etc.). As part of the input, the user may be prompted to input information that identifies a type of the data that may be compromised from a node (device).

The graph data store, in conjunction with the middle ware application, may perform one or more calculations for disruptive and/or exploitative scenarios, as described elsewhere herein with respect to operation 106. Once specific information about node level impacts is collected by the one or more server devices, the one or more server devices may add the generated scenarios to the cyber strand page and may prompt the user to input a minimum and maximum likelihood for the event occurring. For example, a value for the likelihood may be between 0 (indicating that the scenario will almost certainly not occur) and 1 (indicating that the scenario will almost certainly occur).

The one or more server devices may assume that the likelihood falls within a normal distribution and may assume that the minimum and maximum likelihoods represent two standard deviations from the mean (e.g., the minimum may represent two standard deviations below the mean and the maximum may represent two standard deviations above the mean). From those inputs, the one or more server devices may determine the mean by determining the average of those inputs, and the standard deviation may be determined by determining the difference between the two values and dividing by four. The one or more server devices may determine the likelihood for each scenario as the mean, but may utilize the information regarding the minimum and maximum values to calculate a normal distribution of event likelihood, which may be applied when modelling, for example, financial impacts to the organization, as described elsewhere herein.

Once a user has defined a set of scenarios and has identified the duration and the productive impact for each node for each scenario, the one or more server devices may determine and/or provide, for output, a list of the one or more scenarios, likelihoods corresponding to the one or more scenarios, and calculated CDI or CEI, such in Table 1, described below.

FIG. 7 illustrates a Table 1 of example scenarios by cyber strand, according to some embodiments. For example, FIG. 7 illustrates an example Table 1 that the one or more server devices may have generated for a customer service cyber strand (e.g., a cyber strand for a customer service function of an organization). As illustrated in FIG. 7, Table 1 may include an example list generated by the one or more server devices of one or more user-defined scenarios associated with the cyber strand.

In some embodiments, the one or more server devices may provide the Table 1 for display as part of a user interface via the client device. In some embodiments, certain portions of the Table 1 may be selectable. For example, each record in the Table 1 corresponding to each of the one or more scenarios may be selectable. User selection of a scenario (e.g., utilizing an input component of the client device) may cause the one or more server devices to provide, for display, a scenario modal that comprises information identifying the strand, the impacted nodes of the strand, and the exploitive or disruptive effects associated with a specific cyber event.

In this way, certain embodiments may apply specific scenarios grouped by effect and scored according to the specific impacts to devices working together in the production of a service. The calculation of the disruptive or exploitive impact in the table may be performed as described elsewhere herein. In addition, certain embodiments may score risk by multiplying the two components together providing risk calculations based on a variety of effects a hacker can engineer against a cyber strand, as described elsewhere herein. This approach may be different than traditional approaches to measuring cyber risk in some aspects. For example, the quantified value may be for an organizational service supported by a portion of an IT network and not for a standalone system.

Returning to FIG. 1c, the one or more server devices may, at 106, measure an impact of each of the one or more scenarios. The one or more server devices may calculate the severity of a cyber event's primary effect by utilizing one or more index calculations. For example, the one or more server devices may calculate a CDI and/or a CEI. Both indexes may generate scores on a 0 to 1 scale and may allow a user to apply specific scenarios in a cyber strand—each with differing impacts on IT systems—to generate a severity of an effect. The scores may be unit-less and may utilize equations that can be applied with either granular knowledge about the network impacted or broader abstractions useful in more strategic discussions with CEO, board members, or policy makers.

In some embodiments, the one or more server devices may estimate a severity of disruption by calculating the CDI. For example, to assess the consequences of a disruptive event, or to estimate the consequences of different types of disruptive scenarios that could affect an organization's operations, the one or more server devices may calculate the CDI to calculate a severity score. In some embodiments, the one or more server devices may use graph analytics, along with user-defined scenarios, to calculate the severity of all scenarios tied to a cyber strand (e.g., a graph topology).

Figure 8:
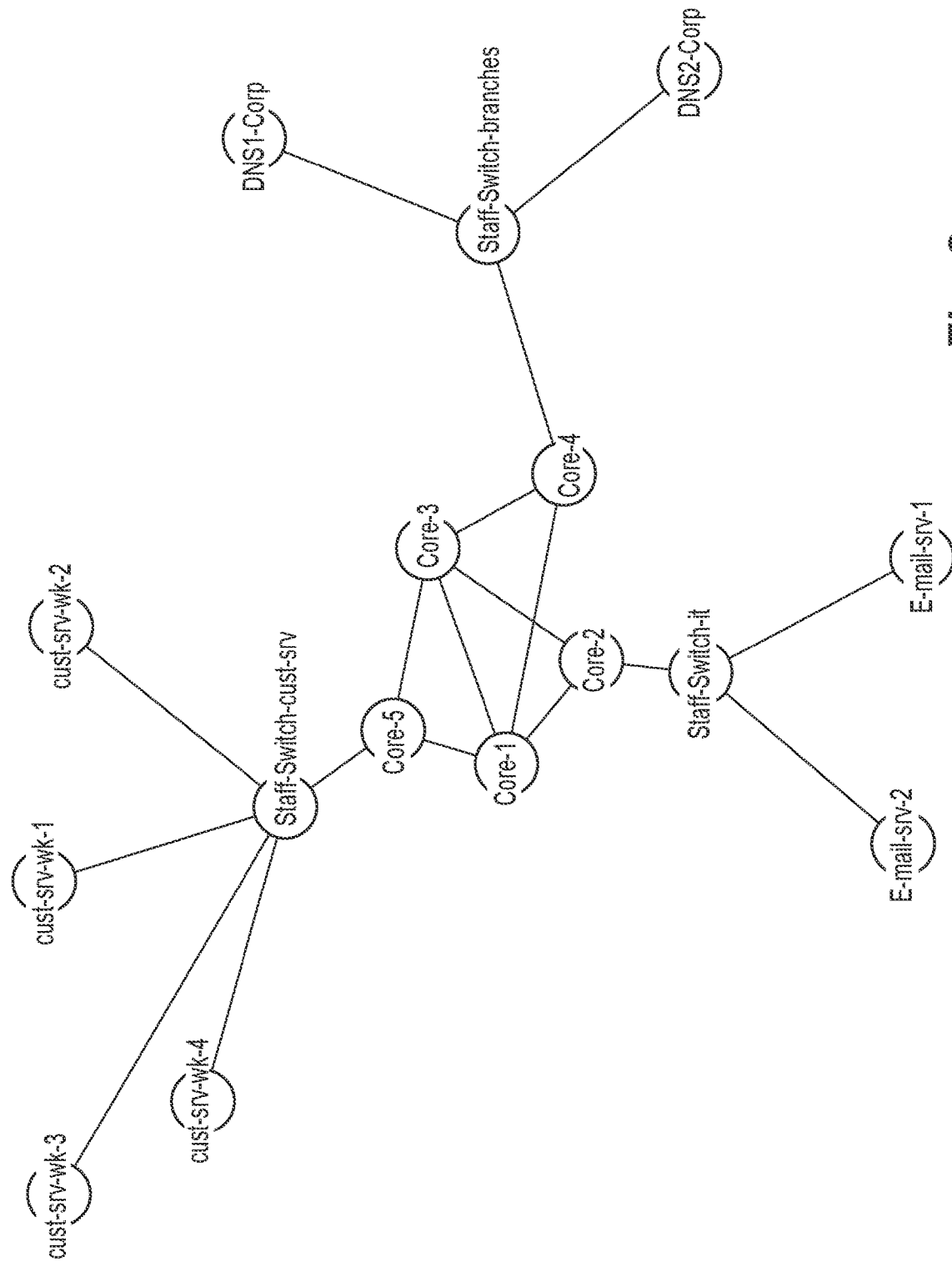
FIG. 8 illustrates an example graph G, according to some embodiments.

FIG. 8 illustrates an example graph G, according to some embodiments. Assume, for example, a graph G of j nodes and e edges, illustrated in FIG. 8. There may be, for any user-defined disruptive scenario S, a CDI value between 0 and 1. The CDI may be represented by the following equation:

$$CDI_S = \sum_t^m \sum_j^n \left( \frac{[(w_{t+m,j+n} + C^e_{t+m,j+n}) * D_{t+m,j+n}]}{\sum_t^m \sum_j^n (w_{t+m,j+n} C^e_{t+m,j+n})} \right)$$

where w may represent an organizational weighting (0≤w≤1), $C^e$ may represent an eigenvector centrality (an eigenvalue score), and D may represent a disruptive impact (0≤D≤1). The CDI may comprise one or more measures to combine the importance of a node in the graph with the disruptive impact of the specific scenario to the productive value of each node, over some period of time. The importance of each node may be first captured by the weighting w assigned by the user.

The weighting may assign a level of the importance of the node to the organization. This may be identified to capture nodes that are important, such as to organizational leadership, and may be deemed important for the operation of a specific organizational function. As noted above, the term $C^e$ may be defined as the eigenvector centrality for a node in the graph and it may measure the importance of the node for all computed paths in G. A sum of one or more weights may be calculated. For example, two weights may be computed to capture two components. The first, w, may be the weight an organization applies to a specific node to represent its general importance. The second term, $C^e$, may be used so that devices not readily identifiable as important, but that may directly facilitate communications between nodes, are accounted for in the index score. The term D, or the disruptive impact to a specific node, may be used to identify how much of the productive capacity of the node may be lost during the disruptive attack.

The product of the weights with the disruptive impact for specific nodes j and n may be individually divided by the sum of the organizationally-defined and eigenvector weights, and then summed over nodes in the graph and over units of time. In this way, certain embodiments described herein may capture three major themes in disruptive attacks: 1) the scope of the attack; 2) the magnitude of the attack; and 3) the duration of the attack.

For example, if graph G had devices named wk-1, wk-2, wk-3, rtr-1, pxy-1, cloud-1, and sup-1, and the one or more server devices have determined to assess the disruptive impact resulting from a variety of scenarios, the one or more server devices may calculate the CDI to generate scores ranging between 0 and 1. If the one or more server devices generate the graph and calculate the eigenvector centrality score for each node (assuming a productive loss between 0 and 1 and an assumed duration of impact for a scenario ("Scenario 1") in which a single device, wk-1, whose productive capacity is completely disrupted for 1 period of time), the one or more devices may utilize following inputs shown in Table 2:

TABLE 2

| Scenario | Device | Eigenvector Score | Organizational Weighting | Productive Impact | Duration | CDI |
|---|---|---|---|---|---|---|
| 1 | Wk-1 | 0.49 | .20 | 1 | 1 Period | 0.03 |
| 1 | Wk-2 | 0.22 | .2 | 0 | 0 | |
| 1 | Wk-3 | 0.22 | .3 | 0 | 0 | |
| 1 | Rtr-1 | 1 | 0 | 0 | 0 | |
| 1 | Pxy-1 | 0.54 | .3 | 0 | 0 | |
| 1 | Cloud-1 | 0.44 | .2 | 0 | 0 | |
| 2 | Wk-1 | 0.49 | .20 | 1 | 3 | 0.34 |
| 2 | Wk-2 | 0.22 | .2 | 1 | 3 | |
| 2 | Wk-3 | 0.22 | .3 | 1 | 3 | |
| 2 | Rtr-1 | 1 | 0 | 1 | 3 | |
| 2 | Pxy-1 | 0.54 | .3 | 0 | 0 | |
| 2 | Cloud-1 | 0.44 | .2 | 0 | 0 | |

By computing the CDI, the one or more server devices may be capable of assessing that this scenario has a disruption score of 0.03 (on a 0 to 1 scale). The score may capture the total disruption of a single node, but given its low duration and the relatively small scope of effect on the graph, may generate a small aggregated disruption score. A different scenario ("Scenario 2"), where several devices are fully impacted for three time periods, may cause the one or more server devices to generate a CDI score of 0.34. In this way, certain embodiments may provide for a repeatable method to calculate the disruptive impact by scenario for a group of devices.

In some embodiments, the one or more server devices may estimate a severity of exploitation by calculating the CEI. For example, to assess the consequences of the theft of data from a network, the one or more server devices may calculate the CEI. The CEI may reflect estimates of the amount and importance of one or more types of information that could be compromised, such as: lost customer records, organizational data, and intellectual property. For example, an event that compromised thousands of old billing records with customer addresses, but no other sensitive details, may receive a lower CEI score than one which accessed hundreds of student or medical records that must legally remain confidential, one that stole the secret recipe for a company's most popular product, or one that stole a formula describing some breakthrough in weapons technology. The equation for the CEI is provided by the following equation:

$$CEI_S = \alpha \frac{CDL_{J+n}}{\sum_j^n CD_{j+n}} + \beta \frac{ODL_{j+n}}{\sum_j^n OD_{j+n}} + \gamma \frac{IPL_{j+n}}{\sum_j^n IP_{j+n}}$$

where $\alpha$ may represent a weight assigned to customer data, $\beta$ may represent a weight assigned to organizational data, $\gamma$ may represent a weight assigned to intellectual property data, CDL may represent customer data lost, CD may represent total customer data, ODL may represent organizational data lost, OD may represent total organizational data, IPL may represent intellectual property lost, and IP may represent total intellectual property. As shown, the CEI for a scenario S may be defined as the weighted sums of customer, organizational, and intellectual property data lost to a hacker across j nodes in a graph G.

If multiple types of information are compromised in an event, such as occurred in the exploitative component of the 2014 Sony pictures hack, calculation of the CEI may make it possible to do a weighted aggregation across different types of losses. The 2014 Sony pictures hack included the theft of data from the corporate e-mail server as well as documents from computers of high-ranking company officials. Data acquired included organizational e-mail for the entire enterprise including the CEO, customer details, and intellectual property (some unreleased movies). Via the CEI scoring, the one or more server devices may be able to assess the overall severity of the loss by aggregating the weighted percentage of each type of data lost in the compromise.

For example, assuming a graph with devices wk-1, wk-2, wk-3, rtr-1, pxy-1, cloud-1, and sup-1, if the one or more server devices determined to score the exploitive impact of two different scenarios, the one or more server devices may calculate the CEI to assess the difference between the two different scenarios. Assuming that the company weighs information equally, values for alpha, beta, and gamma may be 0.333 with the following inputs, shown in Table 3:

TABLE 3

| Scenario | Device | Cust. Data Lost | Cust. Data Total | Org. Data Lost | Org. Data Total | IP Data Lost | IP Data Total | CEI |
|---|---|---|---|---|---|---|---|---|
| 1 | wk-1 | 0 | 100 | 0 | 0 | 0 | 0 | 0.33 |
| 1 | wk-2 | 0 | 100 | 0 | 0 | 0 | 0 | |
| 1 | wk-3 | 0 | 100 | 0 | 0 | 0 | 0 | |

TABLE 3-continued

| Scenario | Device | Cust. Data Lost | Cust. Data Total | Org. Data Lost | Org. Data Total | IP Data Lost | IP Data Total | CEI |
|---|---|---|---|---|---|---|---|---|
| 1 | rtr-1 | 0 | 0 | 0 | 0 | 0 | 0 | |
| 1 | pxy-1 | 0 | 0 | 0 | 0 | 0 | 0 | |
| 1 | cloud-1 | 0 | 500 | 0 | 100 | 500 | 500 | |
| 1 | sup-1 | 0 | 100 | 0 | 500 | 500 | 500 | |
| 2 | wk-1 | 100 | 100 | 0 | 0 | 0 | 0 | 0.04 |
| 2 | wk-2 | 0 | 100 | 0 | 0 | 0 | 0 | |
| 2 | wk-3 | 0 | 100 | 0 | 0 | 0 | 0 | |
| 2 | rtr-1 | 0 | 0 | 0 | 0 | 0 | 0 | |
| 2 | pxy-1 | 0 | 0 | 0 | 0 | 0 | 0 | |
| 2 | cloud-1 | 0 | 500 | 0 | 100 | 0 | 500 | |
| 2 | sup-1 | 0 | 100 | 0 | 500 | 0 | 500 | |

Scenario 1 may assume that a hacker gains access to cloud-1 and sup-1 and obtains all of the intellectual property data. In this scenario, no other data may be acquired and no other devices may be compromised. In this case, the computed CEI score may be 0.33. Scenario 2 may assume that a hacker gains access only to wk-1 and may steal 100 units of information yielding a score of 0.04. Based on this, the exploitive impact of scenario 1 is higher than scenario 2.

In this way, the one or more server devices may use various scoring impacts coupled with graph segmentation to score impact, likelihood, and risk across a range of possible disruptive or exploitive effects. This may provide a nuanced view of risk by organizational function.

Figure 9:
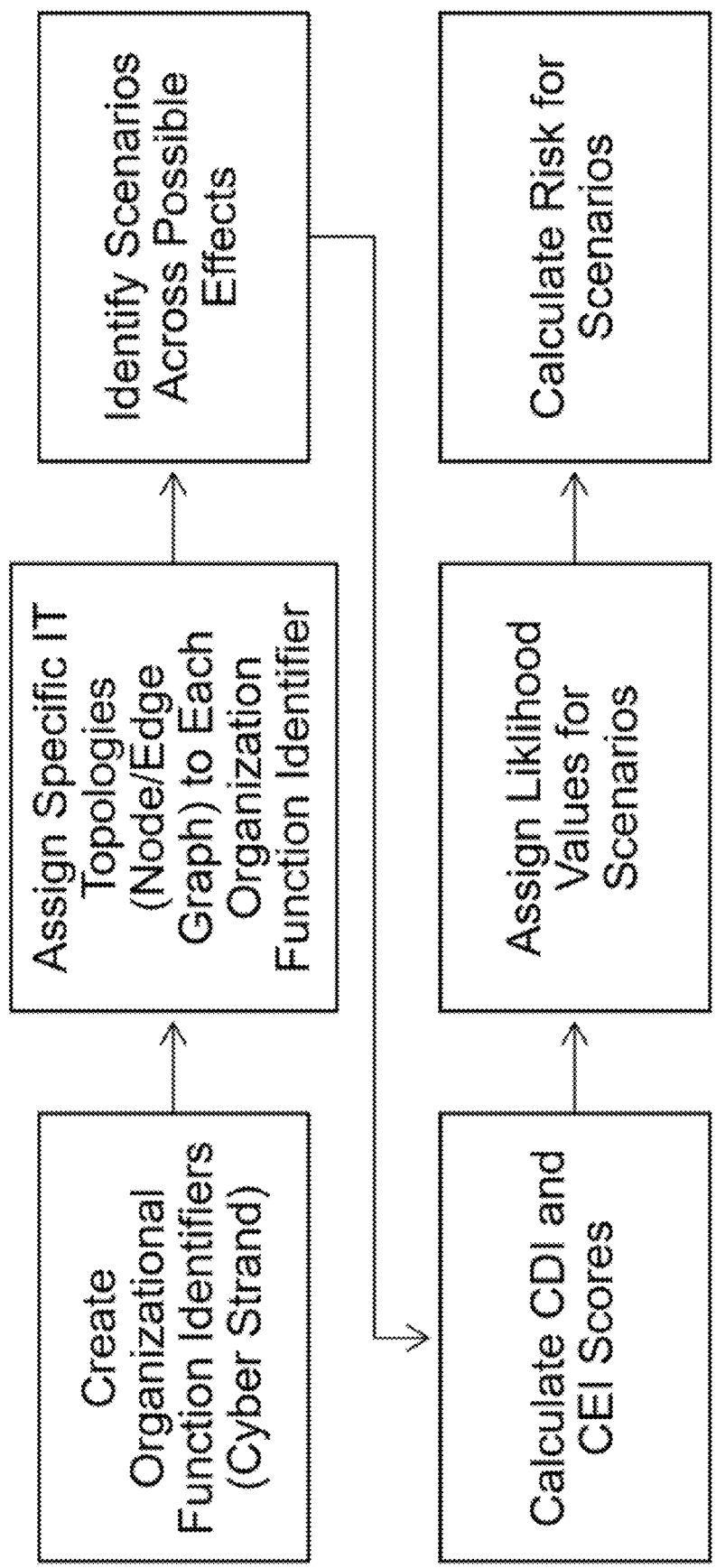
FIG. 9 illustrates an example process for creating a cyber strand, a scenario, and a risk score, according to some embodiments.

Returning to FIG. 1c, the one or more server devices may, at 108, generate a risk score for the each of the one or more scenarios. The one or more server devices may provide a way to define a firm's core functions (e.g., payroll, manufacturing line, etc.), associate the IT devices and their connections, add scenarios, and score the impact of those scenarios, as described above. FIG. 9 illustrates an example process for creating a cyber strand, a scenario, and a risk score, according to some embodiments. FIG. 9 depicts the creation of strands, assigning topologies of devices to the strands, creating scenarios, calculating impact, assessing likelihood, and generating a risk score.

For any number of cyber strands, the one or more server devices may generate the impact and the likelihood of a range of scenarios. Table 4 below shows an example of risk scoring by scenario for customer service cyber strand:

TABLE 4

| | | Customer Service Cyber Strand | | |
|---|---|---|---|---|
| Scenario | Categorized Effect | Liklihood | Impact | Risk |
| 1 | Message Manipulation | .80 | .03 | 0.02 |
| 2 | External Denial of Service | .65 | .25 | 0.16 |
| 3 | Internal Denial of Service | .25 | .45 | 0.11 |
| 4 | Data Attack | .30 | .80 | 0.24 |
| 5 | Physical Attack | .01 | .67 | 0.01 |
| 6 | Exploitation of Sensors | .55 | .01 | 0.01 |
| 7 | Exploitation of End Hosts | .75 | .40 | 0.30 |
| 8 | Exploitation of Network Infrastructure | .89 | .05 | 0.04 |
| 9 | Exploitation of Application Server | .45 | .85 | 0.38 |

TABLE 4-continued

| | | Customer Service Cyber Strand | | |
|---|---|---|---|---|
| Scenario | Categorized Effect | Liklihood | Impact | Risk |
| 10 | Exploitation of Data in Transit | .02 | .74 | 0.01 |

For instance, Table 4 illustrates an example of the outcome of one or more processes described herein. For the customer service cyber strand, Table 4 includes 10 scenarios, each with a calculated impact utilizing the CDI or CEI scoring, and the risk score associated with the scenarios. Each scenario may be scored using the CDI or CEI scoring, and multiplied by the likelihood of the event to generate the risk score.

In some embodiments, the one or more server devices may output information similar to that included in Table 4 for display via the client device (e.g., via display in a user interface). Additionally, or alternatively, the one or more server devices may send this information in a message to the client device. Additionally, or alternatively, the one or more server devices may store this information.

One problem with existing methods for assessing risk is the inability to compare the impact of a range of threats against specified organizational functions. Instead, the existing methods often compare, for example, assessed risk of a router against an application server, with no context on why those devices are important or who uses them and in what capacity. By building topologies of organizational function and utilizing a scenario approach that scores the severity along standardized effects, certain embodiments described herein may provide users a set of features to construct different views of primary risk in their organizations or even between interconnected organizations.

To conduct a complete cyber risk assessment for an individual organization, this consistent and repeatable approach may be rendered, by the one or more server devices, across multiple scenarios and multiple organizational functions as defined by the user. The scored scenarios, arranged within each organizational function, can be combined in customized ways, by the one or more server devices, to display tables, topologic maps, or other visualizations to demonstrate the scored effect, likelihood, and accumulated risk by effect category and/or by function.

The one or more server devices may generate risk maps, or organizational risk fabrics, to provide an easy way for technical staff to communicate with leadership to highlight what type of effect poses the greatest threat to which part of their organization. In some embodiments, the one or more server devices may output this information for display via the client device. The one or more server devices may use their capability to assess risk for individual cyber strands to build custom, multi-service topologies. By utilizing a standard taxonomy of effect, the one or more server devices may be able to group scenarios by effect and then leverage risk scoring to visualize risk across a user defined set of cyber strands (which the one or more server devices may output for display via the client device).

Figure 10:
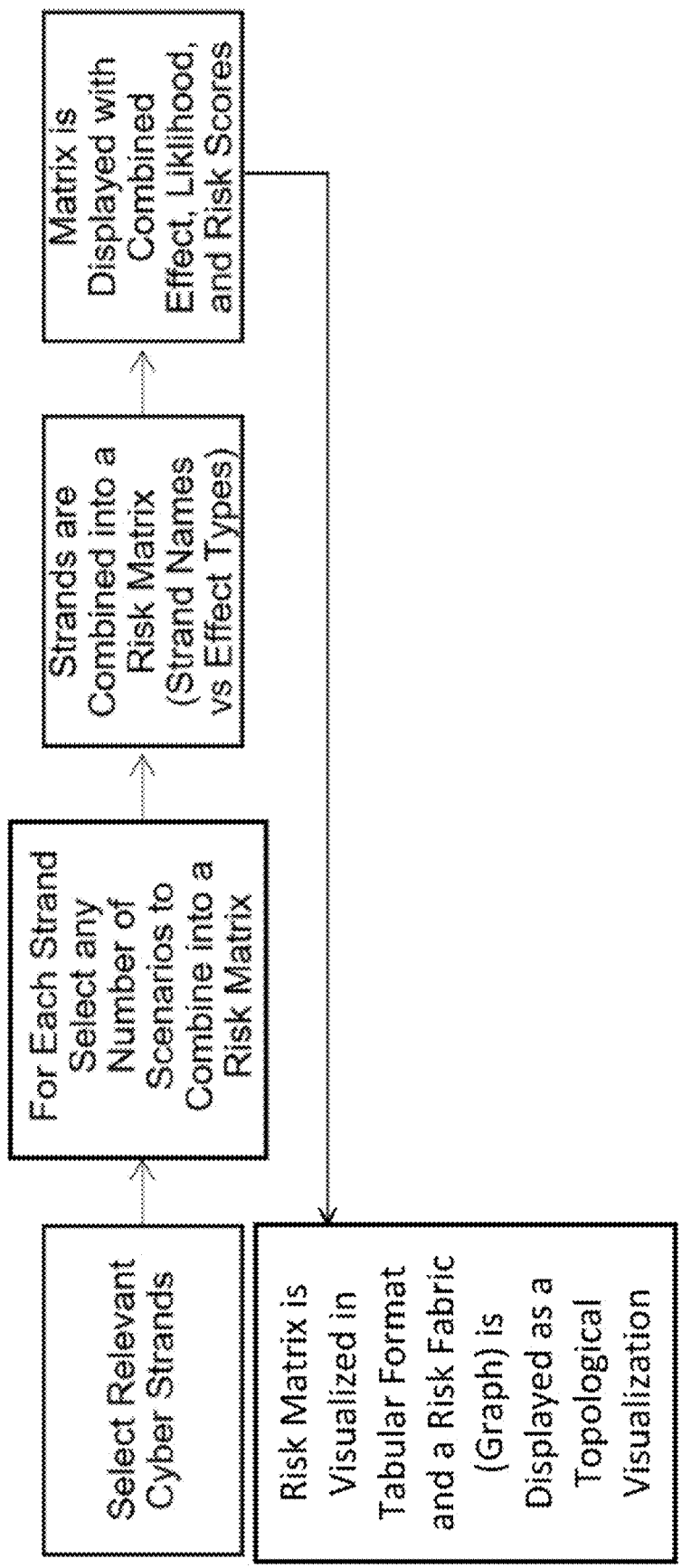
FIG. 10 illustrates an example process for generating a risk fabric, according to some embodiments.

FIG. 10 illustrates an example process for generating a risk fabric, according to some embodiments. For example, FIG. 10 illustrates the process by which the one or more server devices may create a risk fabric. Users, via one or more user interfaces provided for display by the one or more server devices, may be able to select specific strands, identify the scenarios they would like to include, combine the strands and values into a table, and visualize in both a tabular and graph format.

The one or more server devices may generate any number of risk fabrics, allowing for custom topologies by geography, function, or between organizations (e.g., critical infrastructure modelling), and may output the risk fabrics for display via the client device. For example, if a user were to select three strands for a particular company (e.g., customer service, payroll, and shipping), and cause the one or more server devices to create a fabric, the one or more server devices may generate a table (a risk fabric for a fictional company (Acme Corporation)) similar to Table 5 depicted below:

TABLE 5

| Categorized Effect | Customer Service | Payroll | Shipping | Sum of Risk |
|---|---|---|---|---|
| Message Manipulation | 0.02 | 0 | 0 | 0.02 |
| External Denial of Service | 0.16 | 0 | 0.56 | 0.72 |
| Internal Denial of Service | 0.11 | 0.25 | 0.25 | 0.61 |
| Data Attack | 0.24 | 0.45 | 0.85 | 1.54 |
| Physical Attack | 0.01 | 0.02 | 0.07 | 0.10 |
| Exploitation of Sensors | 0.01 | 0.45 | 0 | 0.46 |
| Exploitation of End Hosts | 0.30 | 0.25 | 0 | 0.55 |
| Exploitation of Network Infrastructure | 0.04 | 0 | 0 | 0.04 |
| Exploitation of Application Server | 0.38 | 0.25 | 0.48 | 1.11 |
| Exploitation of Data in Transit | 0.01 | 0.05 | 0 | 0.06 |
| Sum of Risk | 1.28 | 3.16 | 2.21 | 6.65 |

As shown in Table 5, risk scores may be provided by category and/or cyber strand. For example, payroll for the fictional company has the largest degree of total risk, with data attack and exploitation of sensor effects exhibiting the largest degree of risk to a strand. The one or more server devices may calculate the total level of risk of the risk fabric to be 6.65, allowing the users to generate quantifiable risk values for multiple key services. The one or more server devices may define risk fabrics by geography, allowing organizations to segment their analysis of risk by location, and may provide more precise quantification of primary effect risk.

Figure 11:
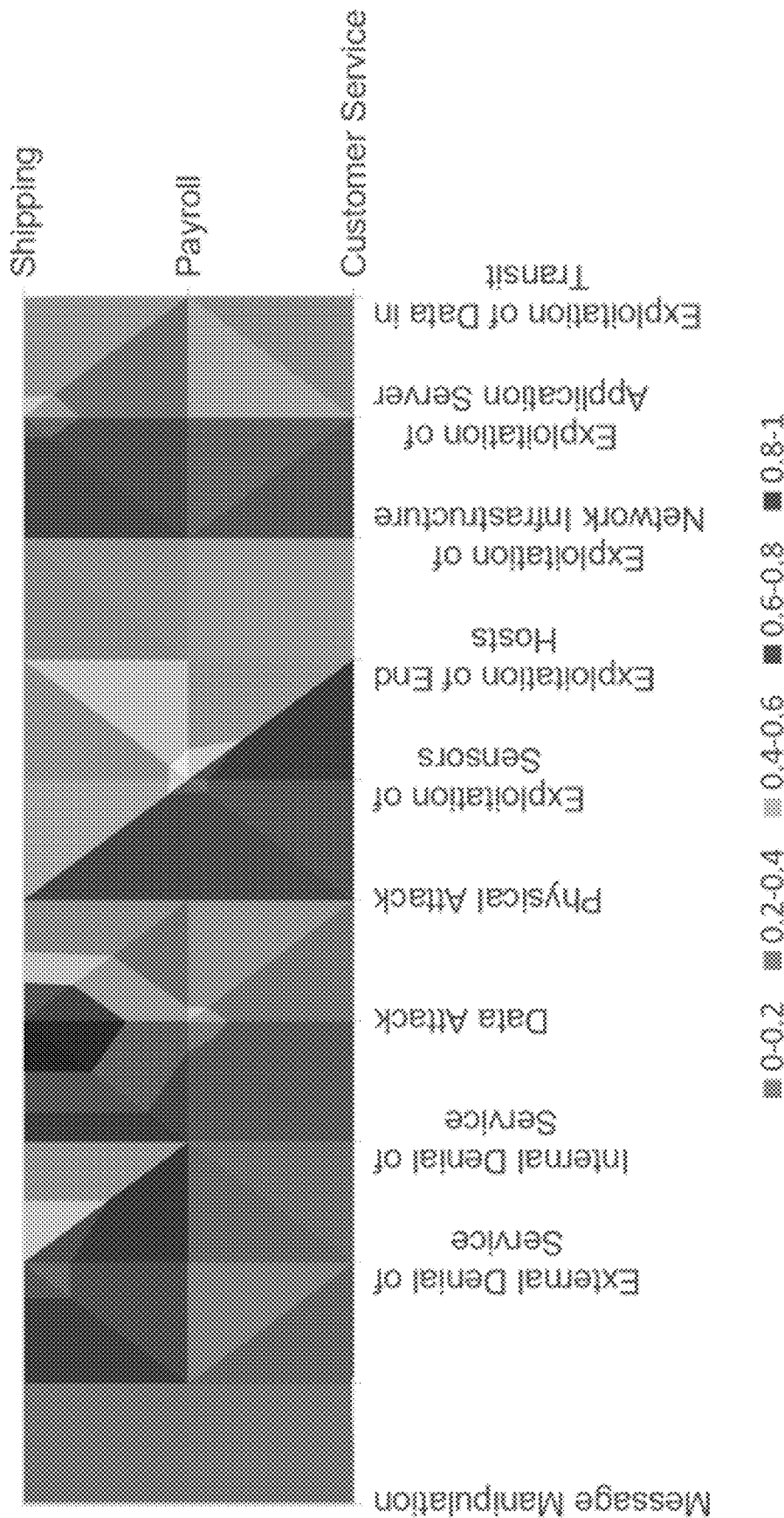
FIG. 11 illustrates an example surface chart of a risk fabric for an example organization, according to some embodiments.

Risk fabrics visualizations may be generated by the one or more server devices through the use of surface charts. FIG. 11 illustrates an example surface chart of a risk fabric for an example organization, according to some embodiments. The visualization of FIG. 11 illustrates a chart that cross-walks the risk computation by cyber strand with the standardized effect in the taxonomy. Taking this approach, the one or more server devices may provide the user a variety of features to define organizational functions, generate scenarios, score them, and visualize stand-alone or integrated risk in a variety of ways. This ability to customize risk visualization across the range of effects may provide an improvement to the field of cybersecurity risk management.

The one or more server devices may perform risk analysis through a structured logic that accounts for primary and secondary effects stemming from a cyberattack. Primary effects, which may be those impacting the targeted network itself, may be measured in the disruptive or exploitive impact of the hacker, and the one or more server devices may quantify impact using the CDI or CEI scoring. However, firms may often have to calculate their risk in terms of the financial impacts realized from an attack. Those financial impacts can be determined in a variety of ways, including revenue losses stemming from the disruption of key industries, remediation costs for damaged equipment, time required to repair damaged systems, and stock market capitalization losses stemming from public disclosure of the event. The one or more server devices may address each of these financial effects by generating revenue loss profiles, which may include a Monte Carlo approach to assessing financial loss deriving from disrupted production, measurement of remediation costs captured organized by impacted devices, and market capitalization impacts assessed by historical analysis of stock price declines by effect type and historical trends in industry.

To compute secondary financial loss for a firm, the one or more server devices may, based on user interfaces provided for display, allow users to build graphs of the cyber strands that are used in the production of a good or service. For example, a firm may use three different organizational functions, each with supporting IT infrastructure, to build their product: logistics and receiving, manufacturing, and shipping. The one or more server devices may provide users with the ability to create a directed production flow—a cyber thread—to select and connect certain organizational components together.

Figure 12:
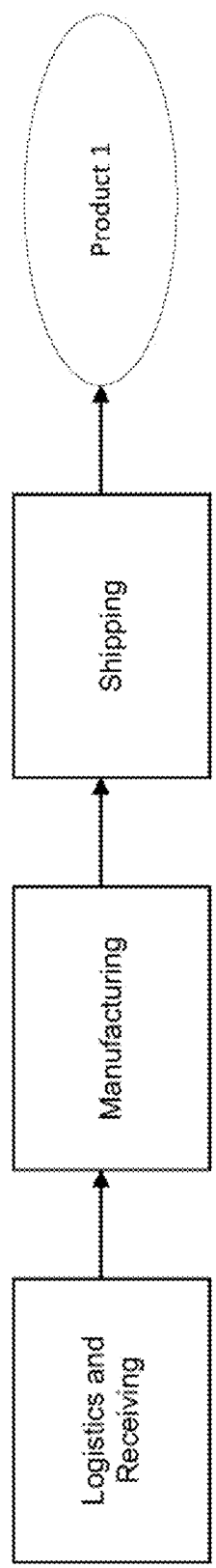
FIG. 12 illustrates an example cyber thread, according to some embodiments.

FIG. 12 illustrates an example cyber thread, according to some embodiments. The one or more server devices may provide user interfaces via which a user may be able to create a new cyber thread, add the cyber strands that are needed to produce a product, and then connect the individual strands together in a directed graph and may generate the cyber thread based on this input. The one or more server devise may prompt a user to add the number of units produced per hour, and the dollar value of each unit produced. The one or more server devices may compile these components together to generate information of the possible financial losses that might stem from a range of attacks against parts of one or more network topologies that work together to produce a product or service.

Given that each cyber strand may have several scenarios defined and scored utilizing the CDI and/or CEI, the one or more server devices may estimate the financial impact by combining the potential revenue for a cyber strand with the disruptive risk each scenario presents. Since each strand may be used for the production of the good or service, any disruption to it may materialize in the loss of revenue. The one or more server devices may provide a way to allow users to build components, run scenarios, and leverage the results to translate it into dollars lost.

Figure 13:
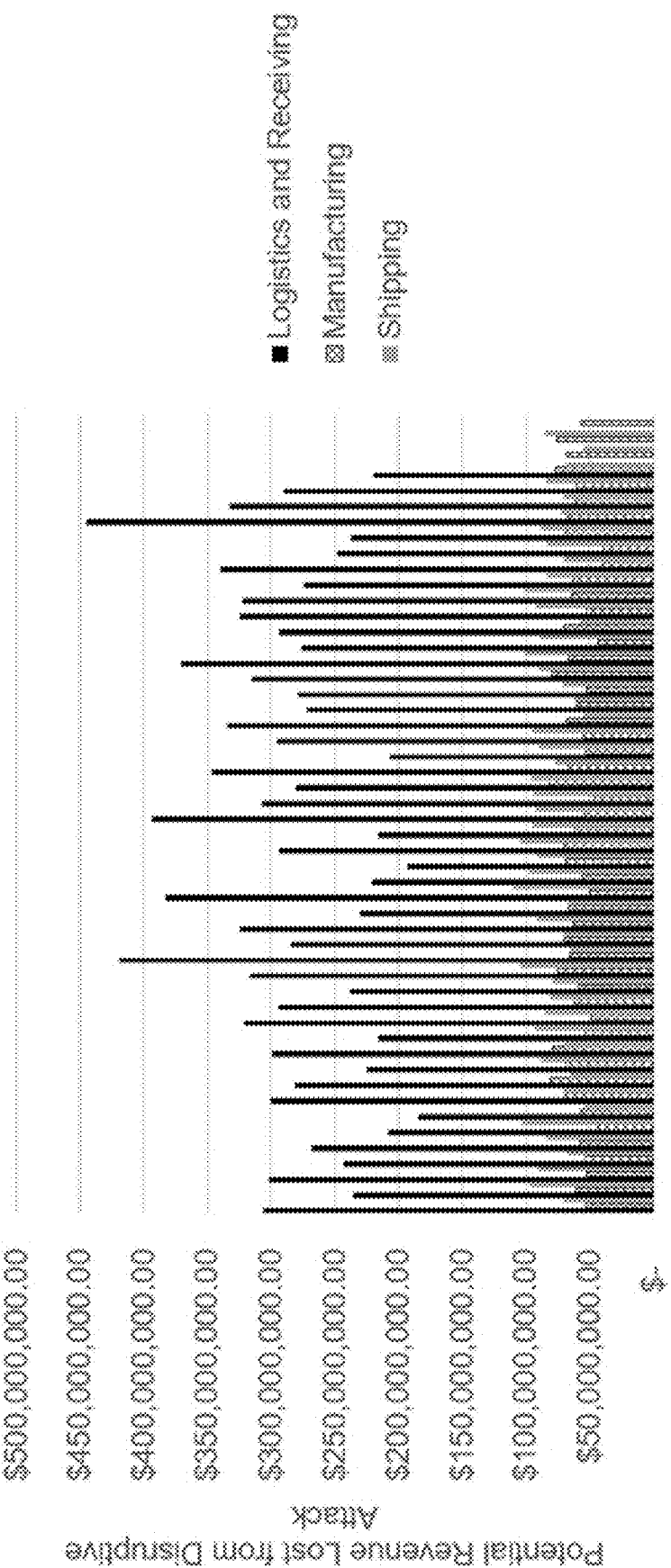
FIG. 13 illustrates an example chart of financial loss by cyber thread, according to some embodiments.

FIG. 13 illustrates an example chart of financial loss by cyber thread, according to some embodiments For example, as illustrated in FIG. 13, the one or more server devices may process the potential revenue a cyber thread can generate over a time period, for example, a 14 day period, and may multiply it by the risk score that was generated for each scenario in each cyber strand. The results may include a series of potential losses charted by scenario and grouped by cyber strand. In the chart there are three example series: logistics and receiving, manufacturing, and shipping, each corresponding to a cyber strand.

Given that cyber threads may contain potentially hundreds of scenarios across multiple cyber strands, the one or more server devices may provide a capability to visualize a complex set of financial losses organized by function or attack classification. Descriptive statistics may include mean, standard deviation, and interval, and the one or more server devices may calculate and provide these statistics to the user via the client device.

Figure 14:
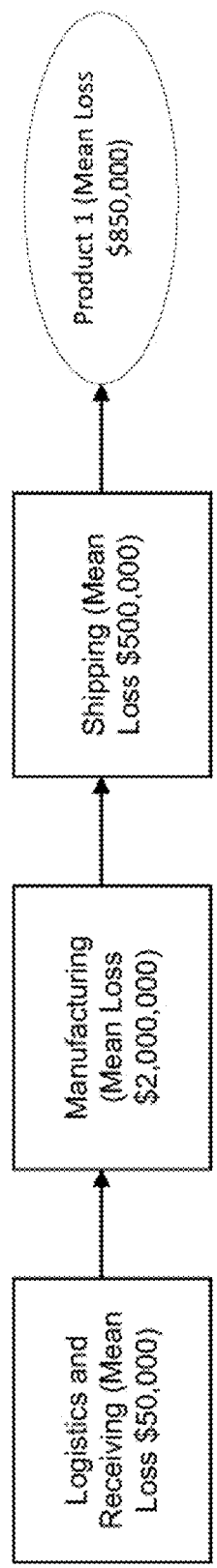
FIG. 14 illustrates an example of component risk output in a cyber thread, according to some embodiments.

Once the financial losses have been computed across the thread, the one or more server devices may generate visualizations of risk either at a summarized level (e.g., mean loss for the cyber thread), or by highlighting component risk by visualizing to the user what part of their production process represents the greatest degree of cyber risk. FIG. 14 illustrates an example of component risk output in a cyber thread, according to some embodiments. For example, if the generated cyber risk for the cyber thread in FIG. 14 is assumed to have a 95% confidence of ranging between $200,000 and $3,000,000, with a mean of $850,000, the one or more server devices may generate a visualization that indicates which component generates the greatest degree of that risk.

In FIG. 14, the cyber thread may identify that the mean loss for the entire production chain is $850,000, while the component loss is highest in the manufacturing cyber strand, with average losses approaching $2,000,000. While the overall expected value of loss across all scenarios in the cyber strands is $850,000, the mean of the scenarios in just the manufacturing strand is $2,000,000. This type of visualization may identify the components of the production or delivery process that generate the greatest integrated risk for the organization. Given that each scenario may be an estimation of integrated disruptive impact, this approach may provide the ability to generate a way to model how a single device can generate a financial loss given its role in a production flow. To generate this understanding of the secondary effects of a cyber-attack, the one or more server devices may utilize certain features: the cyber strand, the severity scores (CEI/CDI), scenario construction across standard classification of effect, and/or the ability to link functional components into a production function. These features may be combined, edited, or removed to generate customized risk maps that estimate primary and secondary effects within or between organizations.

Returning to FIG. 1c, the one or more server devices may, at 110, provide output. For example, the one or more server devices may provide output that identifies the risk score, that is customized based on the risk score, and/or the like. As described above, the one or more server devices may output visualizations, calculation results, and/or the like. In addition, the one or more server devices may store the visualizations, calculation results, and/or the like.

In this way, certain embodiments may help guide risk assessment for individual organizations and for integrated elements of certain infrastructure. Unlike conventional approaches to measuring cyber risk, certain embodiments described herein may not assume a hacker's effect is against a unitary device in a network, but rather may build graphs of services that allow users to identify a range of scenarios and effects against a complex system. This may enable an integrated analysis of cyber risk that builds on the features described elsewhere herein: the cyber strand, the severity scores (CEI/CDI), scenario construction across standard classification of effect, and/or the ability to link functional components into a production function. Using these component parts, certain embodiments may provide the user a variety of features to define organizational functions, generate scenarios, score them, and/or visualize stand-alone or integrated risk in a variety of ways. Given that cyber threads may contain potentially hundreds of scenarios across multiple cyber strands, certain embodiments may provide the ability to visualize a complex set of financial losses organized by function or attack classification.

This ability to customize risk visualization across the range of effects may provide improvements to the field of cybersecurity risk management. For example, certain embodiments may generate scenario-based risk estimates that take into account how specific IT components relate to each other and support different parts of an organization's operations, which may provide a more nuanced risk framework compared to other techniques for assessing risk.

Figure 15:
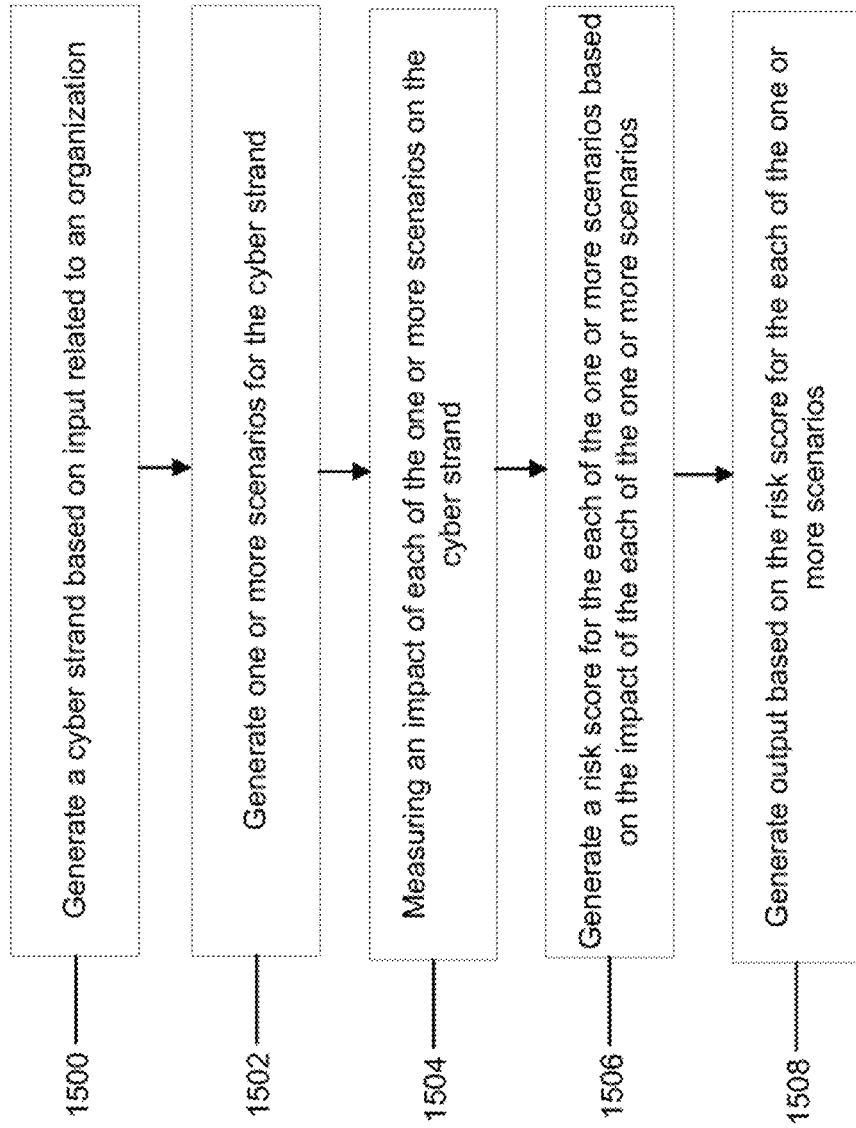
FIG. 15 illustrates an example flow diagram of a method, according to some embodiments.

FIG. 15 illustrates an example flow diagram of a method, according to some embodiments. For example, FIG. 15 shows example operations of a server device (e.g., apparatus 10). Some of the operations illustrated in FIG. 15 may be similar to some operations shown in, and described with respect to, FIGS. 1a-14.

In an embodiment, the method may include, at 1500, generating a cyber strand based on input related to an organization. The cyber strand may identify one or more devices in a network topology. In an embodiment, the method may include, at 1502, generating one or more scenarios for the cyber strand. In an embodiment, the method may include, at 1504, measuring an impact of each of the one or more scenarios on the cyber strand. In an embodiment, the method may include, at 1506, generating a risk score for the each of the one or more scenarios based on the impact of the each of the one or more scenarios. In an embodiment, the method may include, at 1508, generating output based on the risk score for the each of the one or more scenarios.

In some embodiments, the input may comprise information that identifies the one or more devices and the network topology. In some embodiments, the network topology may be associated with a function of the organization. In some embodiments, measuring the impact may include calculating an index that may indicate a severity of a disruption to the each of one or more devices caused by one or more events associated with the each of the one or more scenarios. In some embodiments, calculating the index may comprise calculating the index based on information that identifies an importance of the each of the one or more devices, an eigenvector score for the each of the one or more devices, a disruptive impact score for the each of the one or more devices, and a period of time associated with each of the one or more scenarios.

In some embodiments, measuring the impact may include calculating an index that indicates a severity of an exploitation of data from the one or more devices resulting from one or more events associated with the each of the one or more scenarios. In some embodiments, calculating the index may include calculating the index based on weighted sums of customer data, organizational data, and intellectual property data lost across a subset of the one or more devices during the each of the one or more scenarios.

In some embodiments, generating the risk score may include generating the risk score by multiplying a first index and a second index by a likelihood of one or more events associated with the each of one or more scenarios. In some embodiments, the first index may indicate a severity of a disruption to the one or more devices. In some embodiments, the second index may indicate a severity of an exploitation of data from the one or more devices.

In some embodiments, generating the one or more scenarios may include generating the one or more scenarios based on information that identifies a subset of the one or more devices impacted by one or more events associated with the each of the one or more scenarios and information that categorizes an effect of each of the one or more events. In some embodiments, the first index may indicate a severity of a disruption to the one or more devices. In some embodiments, the second index may indicate a severity of an exploitation of data from the one or more devices.

In some embodiments, generating the one or more scenarios may include generating the one or more scenarios based on information that identifies a likelihood of occurrence of the each of the one or more events. In some embodiments, generating the one or more scenarios may include determining a likelihood for the each of the one or more scenarios by determining a mean likelihood and a standard deviation of the mean likelihood for the each of the one or more events.

In some embodiments, the method may include determining a value of a loss resulting during the each of the one or more scenarios. In some embodiments, generating the output may include generating the output to include information identifying the value of the loss. In some embodiments, determining the value of the loss may include determining the value of the loss based on information that identifies a use of the one or more devices in production of a good or service, a production resulting from the use of the one or more devices, or a value of the goods or services produced from use of the one or more devices. In some embodiments, determining the value of the loss may include determining the value by multiplying the production or the value of the goods or services by the risk score. In some embodiments, generating the output may include generating the output, where the output may include at least one of a risk map or a surface map.

As described above, FIG. 15 is provided as an example. Other examples are possible according to some embodiments.

FIG. 16 illustrates an example of an apparatus 10 according to an embodiment. In an embodiment, apparatus 10 may be a computing device, such as a client device or a server in a communications network or serving such a network. For example, apparatus 10 may be a desktop computer, a laptop computer, or a workstation in the case of a client device or may be a server in a datacenter or in a cloud network in the case of a server device.

As illustrated in the example of FIG. 16, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 16, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster). Processor 12 may perform functions associated with the operation of apparatus 10.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. Transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

According to certain embodiments, apparatus 10 may be controlled by memory 14 and processor 12 to perform the functions associated with any of the embodiments described herein, such as some operations of flow or signaling diagrams illustrated in FIGS. 1a-15.

For instance, in one embodiment, apparatus 10 may be controlled by memory 14 and processor 12 to generate a cyber strand based on input related to an organization. The cyber strand may identify one or more devices in a network topology. In one embodiment, apparatus 10 may be controlled by memory 14 and processor 12 to generate one or more scenarios for the cyber strand. In one embodiment, apparatus 10 may be controlled by memory 14 and processor 12 to measure an impact of each of the one or more scenarios on the cyber strand. In one embodiment, apparatus 10 may be controlled by memory 14 and processor 12 to generate a risk score for the each of the one or more scenarios based on the impact of the each of the one or more scenarios. In one embodiment, apparatus 10 may be controlled by memory 14 and processor 12 to generate output based on the risk score for the each of the one or more scenarios.

Therefore, certain example embodiments provide several technological improvements, enhancements, and/or advantages over existing technological processes. For example, one benefit of some example embodiments is guiding of risk assessment for individual organizations and for integrated elements of certain infrastructure. Accordingly, the use of some example embodiments results in improved functioning of communications networks and their nodes and, therefore constitute an improvement at least to the technological field of risk assessment and/or management, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single server device equally applies to embodiments that include multiple instances of the server device, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. A method for cyber risk analysis, comprising:
generating, by a computing device, a cyber strand based on input related to an organization, wherein the cyber strand identifies one or more devices in a network topology, wherein the input is obtained from an open vulnerability assessment system configured to scan at least one device for network information;
generating one or more scenarios for the cyber strand;
measuring an impact of the one or more scenarios on the cyber strand by calculating a first index, and calculating a second index,
wherein the first index is calculated based on combined information that identifies a magnitude of importance of the one or more devices, an eigenvector score for more devices, a disruptive impact score for the one or more devices, and a period of time associated with the one or more scenarios, and
wherein the second index is calculated based on
weighted sums of customer data, organizational data, and intellectual property data lost across a subset of the one or more devices during the one or more scenarios, and
aggregating a weighted percentage of each type of data lost;
generating a risk score for the one or more scenarios based on the impact of the one or more scenarios;
generating output based on the risk score for the one or more scenarios; and
generating dynamic distributions of risk organized by function or attack classification by implementing the risk score for the one or more scenarios in conjunction with an iterative computational simulation,
wherein calculation of the first index comprises
individually dividing a product of the magnitude of the one or more scenarios with the disruptive impact score for one or more nodes by a sum of an organizationally-defined and eigenvector weight to obtain a resultant value, and
summing the resultant value over nodes in a graph and over units of time; and
providing a visualization of risk across the cyber strand in combination with a plurality of other cyber strands.

2. The method according to claim 1, wherein the input comprises information that identifies the one or more devices and the network topology, wherein the network topology is associated with a function of the organization.

3. The method according to claim 1, wherein generating the risk score comprises:
generating the risk score by multiplying the first index and the second index by a likelihood of one or more events associated with the one or more scenarios,
wherein the first index indicates a severity of a disruption to the one or more devices caused by the one or more events associated with the one or more scenarios,
wherein the second index indicates a severity of an exploitation of data from the one or more devices resulting from one or more events associated with the one or more scenarios.

4. An apparatus for cyber risk analysis, comprising:
at least one processor; and
at least one memory including computer program code,
wherein the at least one memory and the computer program code are configured to, with the at least one processor, cause the apparatus at least to:
generate a cyber strand based on input related to an organization, wherein the cyber strand identifies one or more devices in a network topology, wherein the input is obtained from an open vulnerability assessment system configured to scan at least one device for network information;
generate one or more scenarios for the cyber strand;
measure an impact of the one or more scenarios on the cyber strand by calculating a first index, and calculating a second index,
wherein the first index is calculated based on information that identifies a magnitude of importance of the one or more devices, an eigenvector score for the one or more devices, a disruptive impact score for the one or more devices, and a period of time associated with the one or more scenarios, and
wherein the second index is calculated based on
weighted sums of customer data, organizational data, and intellectual property data lost across a subset of the one or more devices during the one or more scenarios, and
aggregating a weighted percentage of each type of data lost;
generate a risk score for the one or more scenarios based on the impact of the one or more scenarios;
generate output based on the risk score for the each of the one or more scenarios; and
generate dynamic distributions of risk organized by function or attack classification by implementing the risk score for the one or more scenarios in conjunction with an iterative computational simulation,
wherein calculation of the first index comprises
individually dividing a product of the magnitude of the one or more scenarios with the disruptive impact score for one or more nodes by a sum of an organizationally-defined and eigenvector weight to obtain a resultant value, and
summing the resultant value over nodes in a graph and over units of time; and
providing a visualization of risk across the cyber strand in combination with a plurality of other cyber strands.

5. The apparatus according to claim 4, wherein the at least one memory and the computer program code are configured to, with the at least one processor, further cause the apparatus, when generating the one or more scenarios, at least to:
generate the one or more scenarios based on information that identifies a subset of the one or more devices impacted by one or more events associated with one or more scenarios and information that categorizes an effect of the one or more events,
wherein the first index indicates a severity of a disruption to the one or more devices,
wherein the second index indicates a severity of an exploitation of data from the one or more devices.

6. The apparatus according to claim 5, wherein the at least one memory and the computer program code are configured to, with the at least one processor, further cause the apparatus, when generating the one or more scenarios, at least to:
generate the one or more scenarios based on information that identifies a likelihood of occurrence of the one or more events; and
determine a likelihood for the one or more scenarios by determining a mean likelihood and a standard deviation of the mean likelihood for the one or more events.

7. The apparatus according to claim 6, wherein the at least one memory and the computer program code are configured to, with the at least one processor, further cause the apparatus, when generating the risk score, at least to:
generate the risk score by multiplying the first index for the one or more events and the second index for the one or more events by the likelihood for the one or more events.

8. The apparatus according to claim 4, wherein the at least one memory and the computer program code are configured to, with the at least one processor, further cause the apparatus at least to:
   determine a value of a loss resulting during the one or more scenarios; and
   wherein the at least one memory and the computer program code are configured to, with the at least one processor, further cause the apparatus, when generating the output, at least to:
   generate the output to include information identifying the value of the loss.

9. The apparatus according to claim 8, wherein the at least one memory and the computer program code are configured to, with the at least one processor, further cause the apparatus, when determining the value of the loss, at least to:
   determine the value of the loss based on information that identifies a use of the one or more devices in production of a good or service, a production resulting from the use of the one or more devices, or a value of the good or service produced from use of the one or more devices.

10. The apparatus according to claim 9, wherein the at least one memory and the computer program code are configured to, with the at least one processor, further cause the apparatus, when determining the value of the loss, at least to:
    determine the value by multiplying the production or the value of the good or service by the risk score.

11. A non-transitory computer readable medium comprising program instructions for causing an apparatus to perform at least the following:
    generating a cyber strand based on input related to an organization, wherein the cyber strand identifies one or more devices in a network topology, wherein the input is obtained from an open vulnerability assessment system configured to scan at least one device for network information;
    generating one or more scenarios for the cyber strand;
    measuring an impact of the one or more scenarios on the cyber strand by calculating a first index, and calculating a second index,
    wherein the first index is calculated based on information that identifies a magnitude of importance of the one or more devices, an eigenvector score for the one or more devices, a disruptive impact score for the one or more devices, and a period of time associated with the one or more scenarios,
    wherein the second index is calculated based on
       weighted sums of customer data, organizational data, and intellectual property data lost across a subset of the one or more devices during the one or more scenarios, and
       aggregating a weighted percentage of each type of data lost;
    generating a risk score for the one or more scenarios based on the impact of the one or more scenarios;
    generating output based on the risk score for the one or more scenarios; and
    generating dynamic distributions of risk organized by function or attack classification by implementing the risk score for the one or more scenarios in conjunction with an iterative computational simulation,
    wherein calculation of the first index comprises
       individually dividing a product of the magnitude of the one or more scenarios with the disruptive impact score for one or more nodes by a sum of an organizationally-defined and eigenvector weight to obtain a resultant value, and
       summing the resultant value over nodes in a graph and over units of time; and
    providing a visualization of risk across the cyber strand in combination with a plurality of other cyber strands.

12. The non-transitory computer readable medium according to claim 11,
    wherein the first index indicates a severity of a disruption to the one or more devices caused by one or more events associated with the one or more scenarios,
    wherein the second index indicates a severity of exploitation of data from the one or more devices resulting from the one or more events.

13. The non-transitory computer readable medium according to claim 12, wherein the program instructions further comprise program instructions for causing the apparatus, when generating the risk score, to perform at least the following:
    generating the risk score based on determining a product of multiplying the first index and the second index by a likelihood of the one or more events.

14. The non-transitory computer readable medium according to claim 11, wherein the program instructions further comprise program instructions for causing the apparatus to perform at least the following:
    determining a value of a loss resulting from the one or more scenarios.

* * * * *